(12) United States Patent
Takagi et al.

(10) Patent No.: US 6,666,292 B2
(45) Date of Patent: Dec. 23, 2003

(54) SEAT OCCUPANT RESTRAINT SYSTEM FOR VEHICLE

(75) Inventors: Hideo Takagi, Yokohama (JP); Chinmoy Pal, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 18 days.

(21) Appl. No.: 09/832,927

(22) Filed: Apr. 12, 2001

(65) Prior Publication Data

US 2001/0040065 A1 Nov. 15, 2001

(30) Foreign Application Priority Data

May 15, 2000 (JP) .................................... 2000-142208

(51) Int. Cl.[7] ................................................ B60T 7/22
(52) U.S. Cl. .................... 180/274; 180/268; 280/801.1; 701/301
(58) Field of Search .............................. 280/802, 801.1, 280/807; 180/274, 271, 268; 297/480, 216.14, 216.13, 216.1; 701/301, 96

(56) References Cited

U.S. PATENT DOCUMENTS

| | | | | | |
|---|---|---|---|---|---|
| 3,942,819 | A | * | 3/1976 | Schwanz et al. ............. | 297/478 |
| 5,207,618 | A | * | 5/1993 | Nishizawa ................... | 280/806 |
| 5,502,432 | A | * | 3/1996 | Ohmamyuda et al. ....... | 180/271 |
| 5,552,986 | A | * | 9/1996 | Omura et al. ................ | 180/268 |
| 5,626,359 | A | * | 5/1997 | Steffens et al. .............. | 180/268 |
| 5,725,249 | A | * | 3/1998 | Nishide et al. .............. | 280/806 |
| 5,788,025 | A | * | 8/1998 | Nishide et al. ............. | 188/82.7 |
| 5,794,978 | A | * | 8/1998 | Nishide ....................... | 188/82.7 |
| 5,810,417 | A | * | 9/1998 | Jesadanont .................. | 296/68.1 |
| 6,019,424 | A | * | 2/2000 | Ruckert et al. ......... | 297/216.12 |
| 6,022,074 | A | * | 2/2000 | Swedenklef ........... | 297/216.13 |
| 6,024,406 | A | * | 2/2000 | Charras et al. .......... | 297/216.1 |
| 6,109,692 | A | * | 8/2000 | H.ang.land et al. .... | 297/216.13 |
| 6,179,379 | B1 | * | 1/2001 | Andersson ............. | 297/216.12 |
| 6,213,512 | B1 | * | 4/2001 | Swann et al. ................ | 180/271 |
| 6,224,105 | B1 | * | 5/2001 | Lake ........................ | 280/801.1 |
| 6,244,656 | B1 | * | 6/2001 | Mueller .................. | 297/216.13 |
| 6,250,714 | B1 | * | 6/2001 | Nakano et al. ........ | 297/216.12 |
| 6,273,511 | B1 | * | 8/2001 | Wieclawski ............ | 297/216.12 |
| 6,340,176 | B1 | * | 1/2002 | Webber et al. .............. | 280/805 |
| 6,385,517 | B1 | * | 5/2002 | Kore .......................... | 180/271 |
| 6,419,271 | B1 | * | 7/2002 | Yamada et al. .......... | 280/801.1 |
| 2001/0054816 | A1 | | 12/2001 | Brambilla et al. | |

FOREIGN PATENT DOCUMENTS

| | | |
|---|---|---|
| JP | 6-286581 | 10/1994 |
| JP | 11-321496 | 11/1999 |
| JP | 11-321552 | 11/1999 |
| JP | 11-334437 | 12/1999 |
| JP | 11-334503 | 12/1999 |

* cited by examiner

Primary Examiner—Paul N. Dickson
Assistant Examiner—Toan C To
(74) Attorney, Agent, or Firm—Foley & Lardner

(57) ABSTRACT

A rear end collision sensor is designed to detect the possibility of a rear end collision of a vehicle in advance. Upon detection, a controller drives a seat belt system to restrain the head of a seat occupant toward a headrest of the seat or to straighten the spine of the seat occupant to protect the neck against impending impact.

26 Claims, 25 Drawing Sheets

SEAT OCCUPANT RESTRAINT SYSTEM FOR VEHICLE

BACKGROUND OF THE INVENTION

The present invention relates to a restraint system for vehicle.

A Published Japanese Patent Application Kokai No. 06(1994)-286541 discloses a vehicle seat belt system including first and second pretensioners, an ultrasonic sensor, a G sensor and a controller.

SUMMARY OF THE INVENTION

However, this seat belt system merely takes up a slack when a frontal collision is predicted, and leaves a rear end collision out of consideration.

It is an object to the present invention to provide a restraint system, or a vehicle equipped with a restraint system, or a control process for a restraint system which can restrain a seat occupant effectively in case of a rear end collision.

According to the present invention, a vehicle comprises: a seat comprising a seat cushion and a seat back; a headrest mounted on an upper portion of the seat back; a restrain system, such as a seat belt system, to secure a seat occupant on the seat so as to restrain the head of the seat occupant toward the headrest and straighten the spine of the seat occupant; a rear end collision sensor to detect a possibility of a rear end collision of the vehicle in advance; and a controller to drive the restrain system in response to detection of the possibility of a rear end collision.

A seat occupant restraint apparatus according to another aspect of the present invention, comprises: means for detecting a possibility of a rear end collision of a vehicle in advance; and means for tightening a seat occupant restraining or restrain system to restrain the head of a seat occupant toward a headrest of a seat and to straighten the spine of the seat occupant when the possibility of a rear end collision is detected.

A seat occupant restraint control process according to the present invention comprises: detecting a possibility of a rear end collision of a vehicle in advance; and driving a seat occupant restraining or restrain system to restrain the head of a seat occupant toward a headrest of a seat and to straighten the spine of the seat occupant when the possibility of a rear end collision is detected.

DETAILED DESCRIPTION OF THE INVENTION

Figure 1:
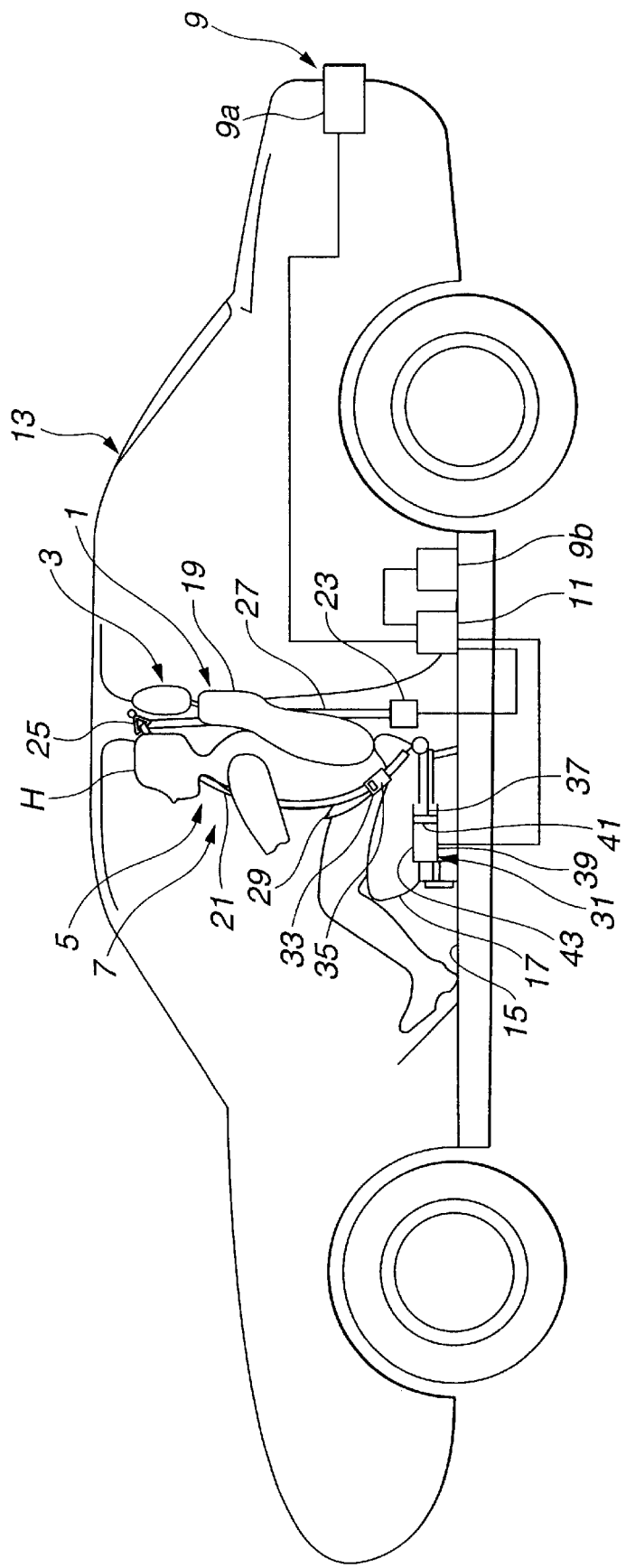
FIG. 1 is a schematic view showing a vehicle equipped with a restraint system according to a first embodiment of the present invention.

FIG. 1 shows a vehicle equipped with a seat occupant restraint system according to a first embodiment of the present invention. The vehicle includes at least one seat 1, a headrest 3 mounted on seat 1, a restraining or restrain system, such as a seat belt system, including at least a first restraint section 5 for restraining the head of a seat occupant toward headrest 3 and a second restraint section 7 for correcting the posture of the seat occupant, a rear end collision sensor 9 and a controller 11.

Seat 1 is mounted on a floor 15 of a vehicle body 13. Seat 1 includes at least a seat cushion 17 and a seat back 19. Headrest 3 is mounted on the top of seat back 19, and designed to support the head of a seat occupant seated on seat 1 from the back side of the head. Headrest 3 of this example is of an adjustable type capable of adjusting the vertical position of headrest 3 with respect to seat back 19.

Restrain system of this example includes an upper torso restraint in the form of a shoulder belt 21 and a first actuator in the form of a seat belt retractor 23. Shoulder belt 21 includes webbing for passing over one shoulder of a restrained seat occupant and extending diagonally across the chest of the restrained occupant to a lower lateral position, to secure the upper torso of the restrained occupant to seat 1.

Seat belt retractor 23 is connected with an upper portion of shoulder belt 21 through a belt section 27, and arranged to retract shoulder belt 21. The upper portion of shoulder belt 21 is passed through a shoulder anchor member 25 located at a shoulder anchorage position, and united with belt section 27. Shoulder anchor member 25 is supported by vehicle body 13, and designed to transmit the load from shoulder belt 21 to the vehicle structure. Belt section 27 extends downward from shoulder anchor member 25 to seat belt retractor 23. In this example, the shoulder anchorage position of shoulder anchor member 25 is located on an outboard side, above the top of seat back 19.

Seat belt retractor 23 of this example is reversible, and has therein a motor capable of letting off and taking up the webbing in response to an input signal. A reel (or pulley) for winding and storing the webbing has a shaft connected with the shaft of the motor. The motor rotates the reel in a winding direction to take up the webbing and in an unwinding direction to let off the webbing. Thus, seat belt retractor 23 can take up and let off shoulder belt 21 through belt section 27.

Restrain system of this example further includes a pelvic restraint in the form of a lap belt 29 and a second actuator in the form of an inner buckle actuator 31. Lap belt 29 includes webbing for extending laterally across the lap of a seat occupant from a first lap anchorage position on a first lateral side to a second lap anchorage position on a second lateral side to secure the lap to seat 1. In this example, lap belt 29 is anchored to vehicle body 13 on the first lateral side which is the outboard side. Lap belt 29 and shoulder belt 21 of this example are connected continuously with each other, and lap belt 29 and shoulder belt 21 of this example are sections of a single continuous seat belt. The webbing is passed through a tongue member 33 designed to be fitted into a buckle 35. Buckle 35 is arranged to latch and release tongue member 33. Buckle 35 is installed on the second lateral side which is the inboard side of seat. Inner buckle actuator 31 of this example includes a cylinder actuator 39 for pulling buckle 35 through a wire 37. Cylinder actuator 39 is of an explosive type, and includes a piston 41 moved by the force of explosion and a cylinder 43 receiving piston 41 slidably. Wire 37 is connected to piston 41.

Controller 11 drives seat belt retractor 23 and cylinder actuator 39 of buckle actuator 31 by sending signals in response to signals from the rear end collision sensor 9. Controller 11 serves as a controller of a seat belt control system or restraint force control system. Rear end collision sensor 9 of this example includes a first sensing section 9a for detecting the possibility or imminence of a rear end collision of the vehicle in advance, and a second sensing section 9b for detecting the occurrence of a rear end collision.

First sensing section 9a of the rear end collision sensor 9 of this example includes a distance sensor for sensing a vehicle-to-vehicle distance ΔS from the vehicle to a following vehicle behind, to predict the occurrence of a rear end collision before the following vehicle runs into the preceding vehicle from behind. The distance sensor may include an ultrasonic sensor or a millimeter wave radar. The distance sensor may be a system of sensors.

Second sensing section 9b of this example includes a vehicle acceleration sensor for sensing a longitudinal acceleration of the vehicle to detect the occurrence of a rear end collision. Second sensing section 9b may be a combination of a longitudinal acceleration sensor and a lateral acceleration sensor.

Figure 2:
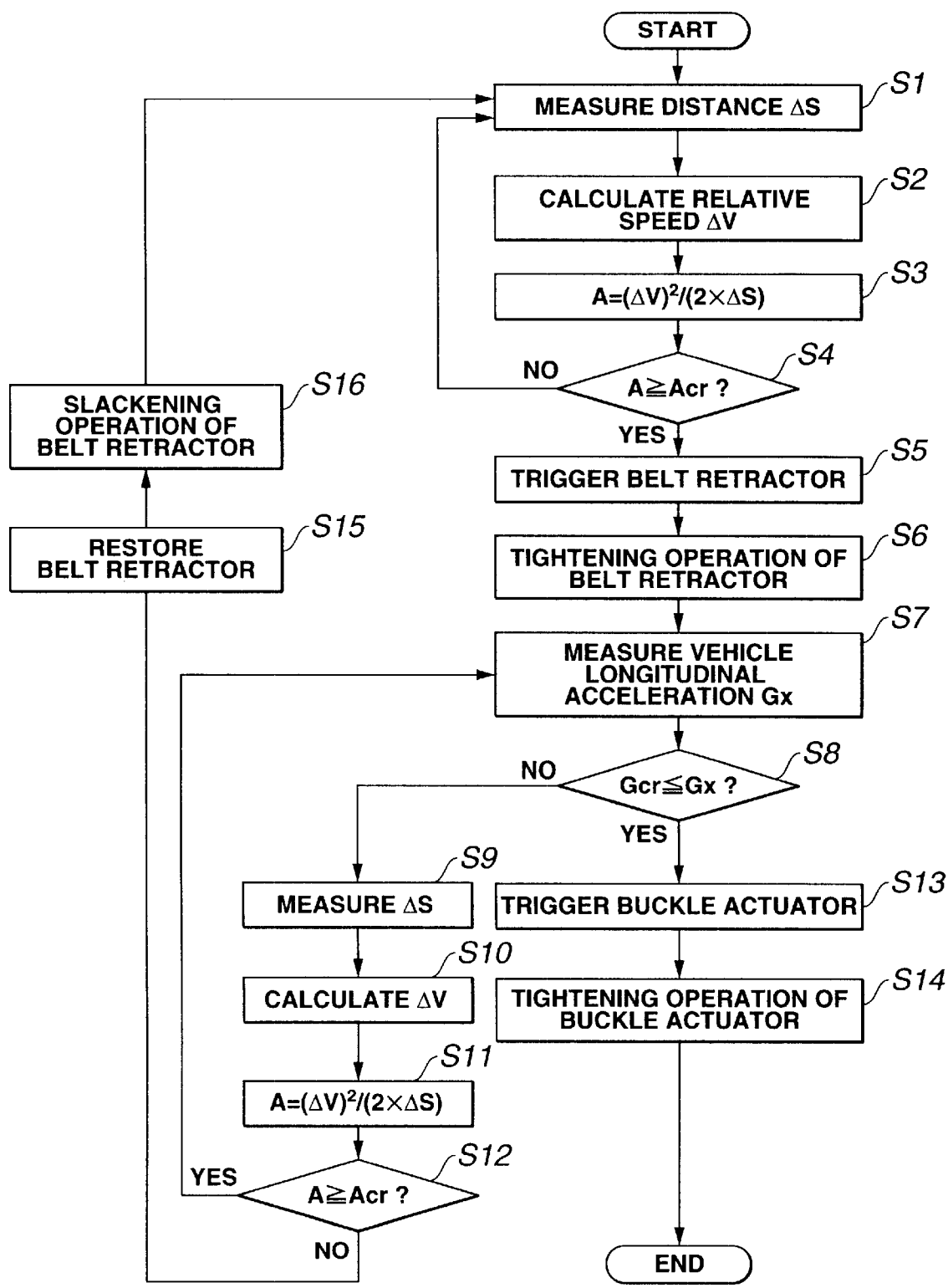
FIG. 2 is a flowchart showing a restraint control procedure according to the first embodiment.

FIG. 2 shows a restraint control procedure according to the first embodiment of the present invention. Steps S1~S4, and S9~S12 constitute a program section for detecting the possibility or imminence of a rear end collision before actual occurrence of a rear end collision. A prediction signal (in the form of an affirmative answer of step S4) is produced when the possibility of a rear end collision is detected. Steps S7 and S8 constitute a program section for detecting the actual occurrence of a rear end collision. A collision signal (in the form of an affirmative answer of step S8) is produced when the occurrence of a rear end collision is detected.

When the possibility or imminence of a rear end collision is detected and the prediction signal is produced, then step S5 is reached from step S4. Controller 11 performs an operation to produce a first trigger signal to trigger the seat belt retractor 23 at step S5. At a next step S5, seat belt retractor 23 receives the first trigger signal from controller 11 and winds up belt section 27 to tighten shoulder belt 21 across a restrained seat occupant.

If the occurrence of a rear end collision is detected at steps S7 and S8 and the collision signal is produced, step S13 is reached, and controller 11 produces a second trigger signal at step S13 to trigger buckle actuator 31. At step S14, buckle actuator 31 receives the second trigger signal and retracts buckle 35.

When a rear end collision is not detected at steps S7 and S8, control is transferred to sections S9~S12 to continue to monitor the possibility of a rear end collision. If the possibility of a rear end collision diminishes by a driver's operation to avoid collision or by other factors, controller 11 proceeds from step S12 to step S15, produces and outputs a first restore signal to restore seat belt retractor 23 at steps S15 and S16, and returns to step S1 to repeat the procedure. In response to the first restore signal, seat belt retractor 23 lets off belt section 27 and thereby provide slack to shoulder belt 21 again at step S16. Therefore, after the danger of a rear end collision has passed, the seat belt system can continue to restrain a seat occupant with adequate slack to the comfort.

The possibility of a rear end collision is detected in the following manner at steps S1~S4 and S9~S12.

Step S1 is to measure the vehicle-to-vehicle distance ΔS between a following vehicle and the host vehicle which is the vehicle equipped with this restraint system as shown in FIG. 1, by reading the signal supplied from the first section 9a of rear end collision sensor 9. Step S2 calculates a relative speed ΔV between the host vehicle and the following vehicle by calculating a gradient of ΔS or a time rate of change of the distance ΔS. Step S3 calculates a parameter A representing the possibility of a rear end collision by using measured distance ΔS and calculated relative speed ΔV according to the following equation.

$$A = (\Delta V)^2 / \{2 \times (\Delta S)\}$$

The parameter A indicates the deceleration of a following vehicle required for the following vehicle to reach a condition of ΔV=0 behind the host vehicle from the current state of the current distance ΔS and current relative speed ΔV, without colliding against the rear end of the host vehicle.

Alternatively, this parameter may be given by:

$$A = (\Delta V)^2 / \{2 \times (\Delta S - S')\}$$

The parameter A given by this equation indicates the deceleration required for the following vehicle to stop, without rear end collision, at a distance S' rearward of the host vehicle.

At step S4, the parameter A is compared with a reference deceleration value Acr stored in controller 11. In this example, reference deceleration value Acr is representative of a deceleration value which a vehicle can produce to stop without emergency brake operation. If the parameter A is equal to or greater than reference value (that is, Acr≦A), then controller 11 judges that the possibility of a rear end collision is detected, and produces the prediction signal representing the possibility or imminence of a rear end collision.

Step S8 is arranged to compare the sensed longitudinal acceleration Gx sensed by vehicle longitudinal acceleration sensor 9b, with a reference acceleration value Gcr stored, as threshold, in controller 11. If the sensed longitudinal acceleration Gx is equal to or higher than reference acceleration value Gcr (Gcr≦Gx), then controller 11 judges that a rear end collision has occurred, and produces the collision signal indicating the occurrence of a rear end collision.

Figure 3:
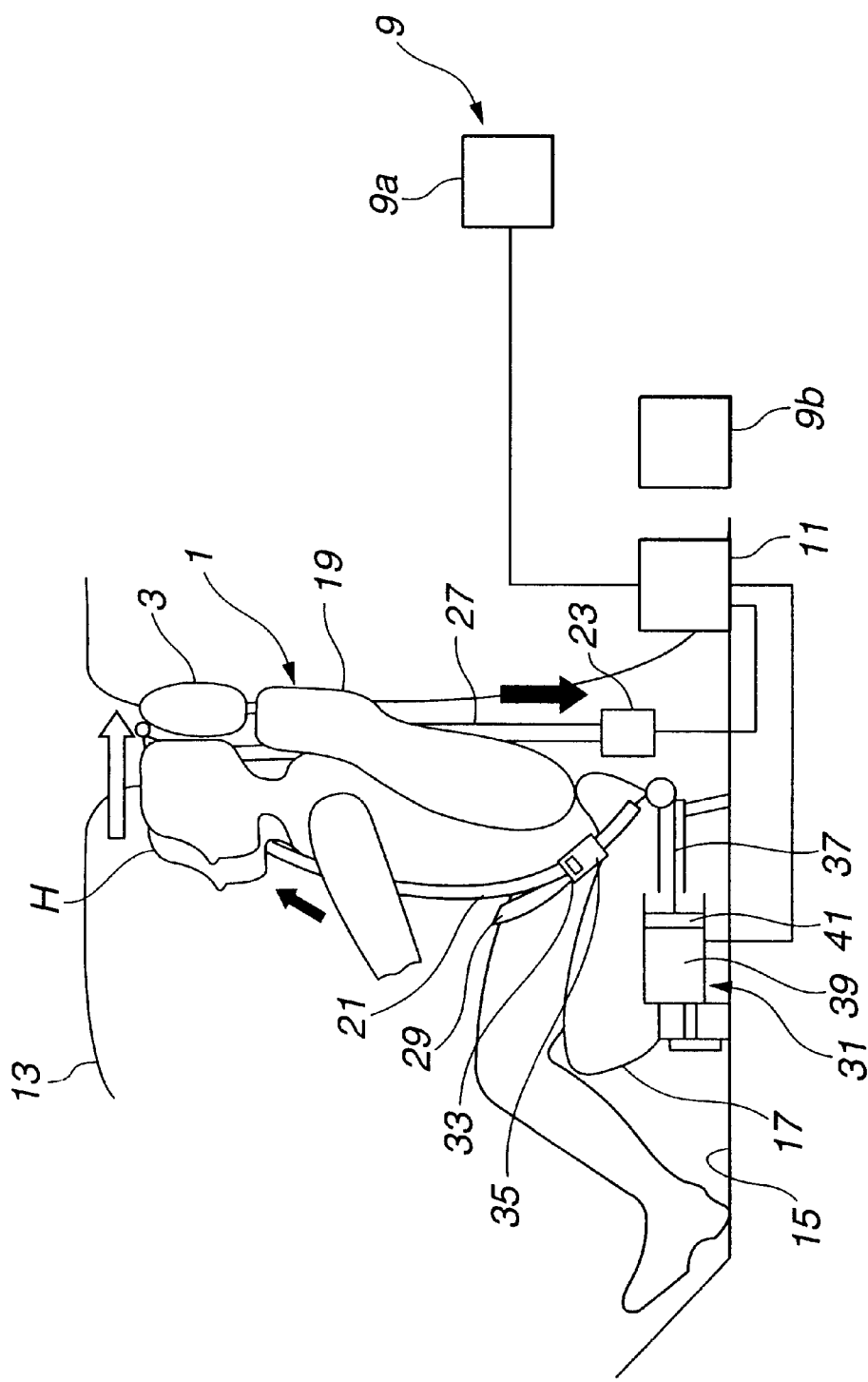
FIGS. 3~6 are views for illustrating operations of the restraint system of FIG. 1.

When the possibility of a rear end collision is detected in advance, that is, before the actual occurrence, the seat belt retractor 23 starts winding up belt section 27 as shown by a downward arrow in FIG. 3, and thereby produces belt tension in shoulder belt 21. Consequently, the chest of a seat occupant is pressed rearward against seat back 19, and the head H of the seat occupant is shifted to a position which is closer to headrest 3 and hence adequate to reduce an impact to the neck of the seat occupant with headrest 3 in case of an actual rear end collision.

Figure 4:
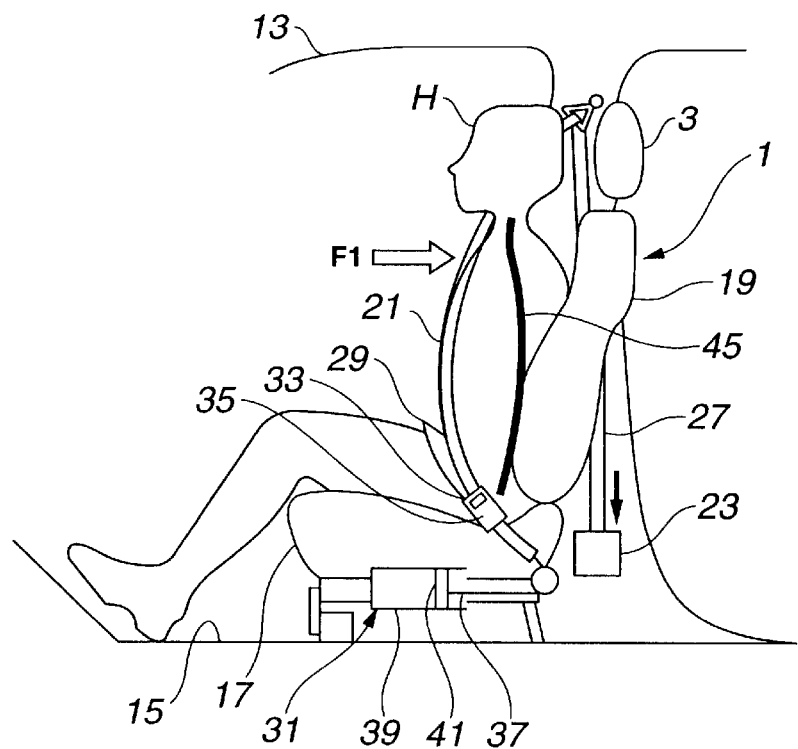
Figure 5:
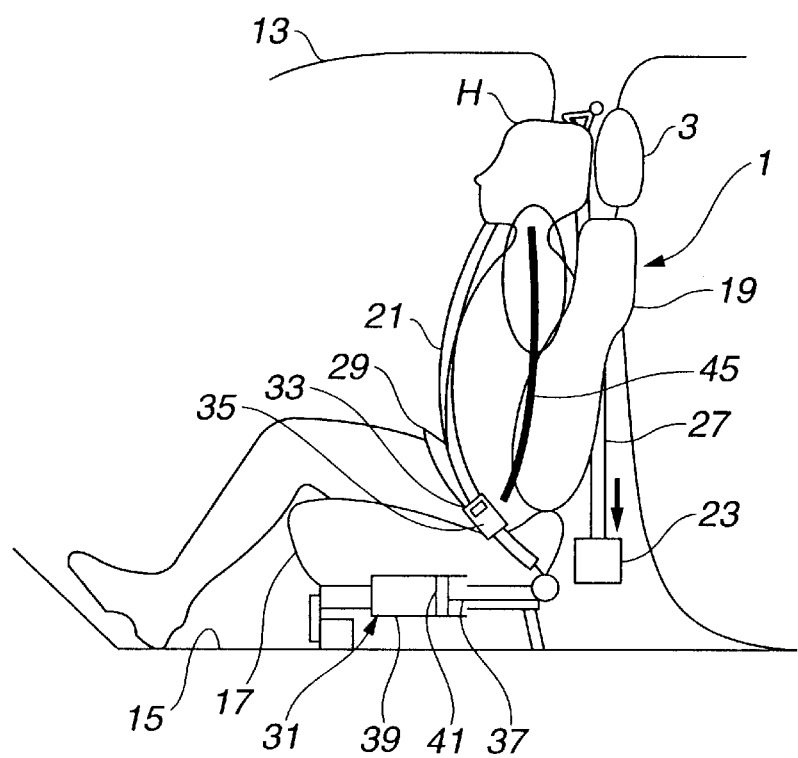

As shown in FIG. 4, the thus-produced belt tension of shoulder belt 21 across the chest of the restrained seat occupant acts to produce a restraint force F1 acting on the upper part of the chest in the rearward direction of the vehicle, and thereby to straighten the upper part of the spine 45 of the seat occupant as shown in FIG. 5 to suppress upthrust movement of the cervical vertebra of the seat occupant in case of a rear end collision and thereby to protect the cervical vertebra.

Figure 6:
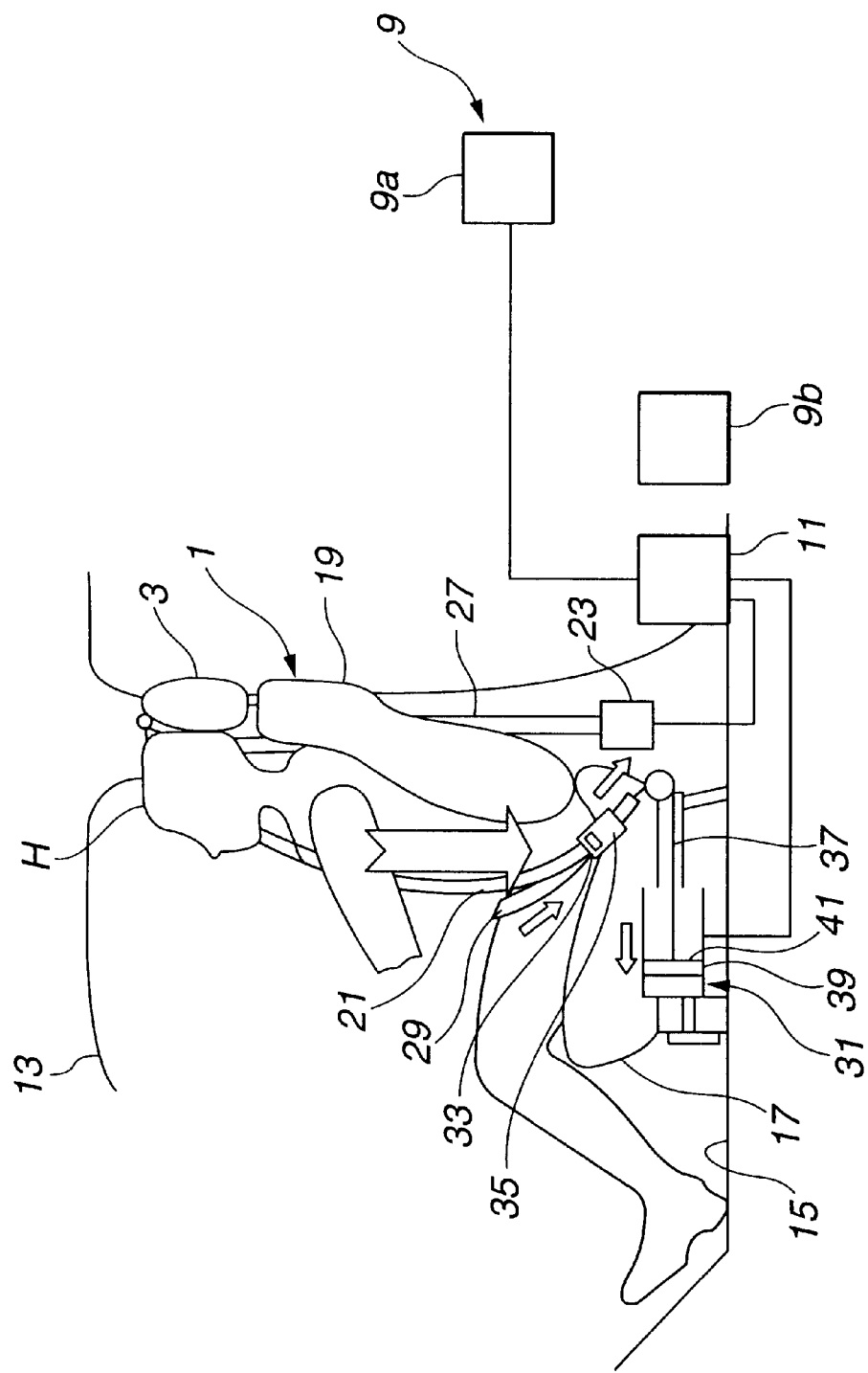

When the occurrence of a rear end collision is detected, buckle actuator 31 pulls buckle 35 in with cylinder actuator 39 as shown in FIG. 6, to produce tension in the seat belt. With this movement, buckle 35 increases the belt tension in both of shoulder belt 21 and lap belt 29 by pulling the intermediate belt section between shoulder belt 21 and lap belt 29. The tension of lap belt 29 produces a downward restraint force acting on the waist of the seat occupant. With the actuation of the inner buckle actuator 31 after the occurrence of a rear end collision, this restraint system can suppress uplift behavior of a seat occupant in case of a rear end collision of a relatively high relative speed ΔV.

This restraint system can directly warn a driver and a passenger, of an impending rear end collision by providing the belt tension before the occurrence of the rear end collision. The driver can act to avoid a collision immediately.

This embodiment is applicable to a vehicle seat having a headrest adjusting system of earlier technology to move a headrest toward the head H of a seat occupant to reduce an impact to the neck by utilizing a restraint force applied to the seat back by rearward movement of the seat occupant at the time of a rear end collision. In this case, this embodiment can improve the restraining function in cooperation with such a head rest adjusting system. The belt tightening operation pushes the chest of the seat occupant to seat back 19 and thereby decrease the distance from the chest to a pressure sensing unit buried in seat back 19. Therefore, the pressure sensing unit can detect the load of the seat occupant earlier, and initiate the headrest adjusting operation promptly to reduce an impact to the neck of the seat occupant.

Thus, the restraint system of this embodiment can cause the pressure sensing unit to initiate the headrest adjusting operation earlier even when the pressure sensing unit is buried deep in the seat back to improve the comfort of the seat occupant.

By tightening the seat belt before a collision, this seat belt type restraint system can suppress rebound behavior of a seat occupant in the case of a rear end collision at a relatively low relative speed.

FIGS. 7~11 show a vehicle equipped with a seat occupant restraint system according to a second embodiment of the present invention. The second embodiment further employs a seat occupant sensor in the form of seat cushion load sensor 47 and seat back load sensor 49, and a reversible inner buckle actuator 50. The second embodiment is substantially identical to the first embodiment in many aspects, and the substantially identical parts are given the same reference numerals as in the first embodiment.

Figure 7:
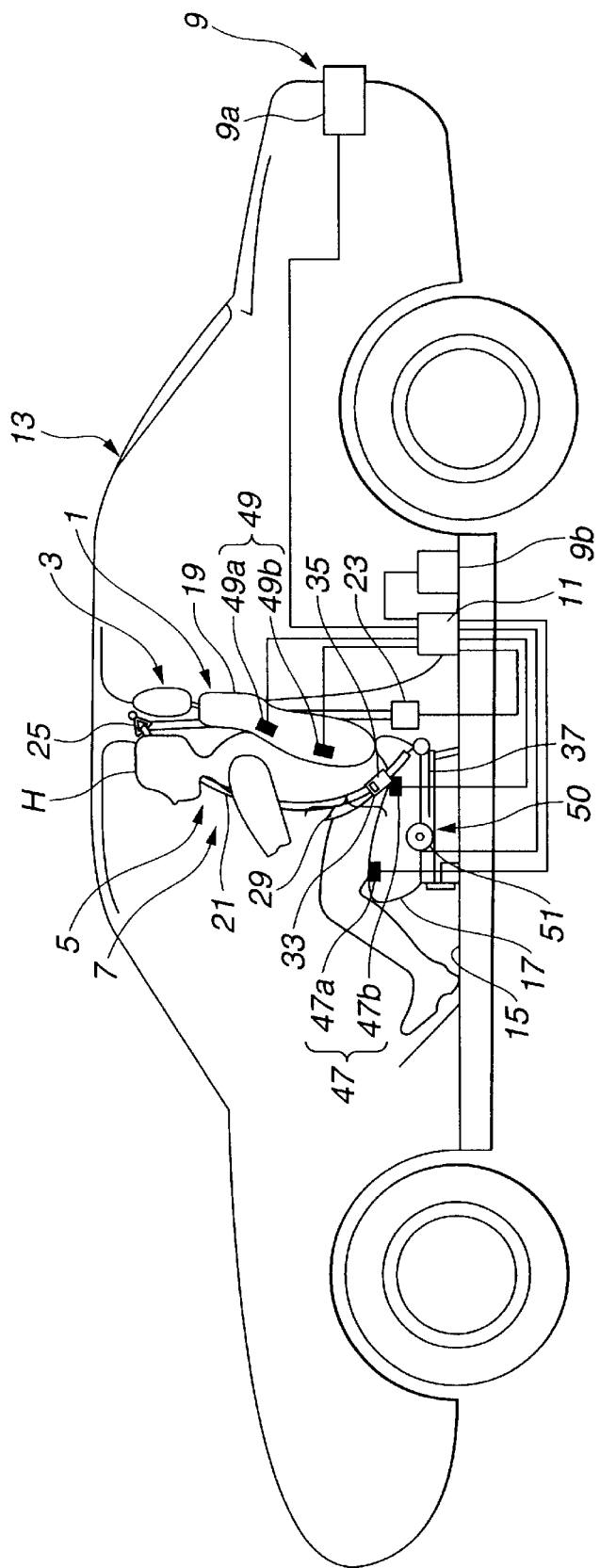
FIG. 7 is a schematic view showing a vehicle equipped with a restraint system according to a second embodiment of the present invention.

As shown in FIG. 7, seat cushion load sensor 47 of this example includes a front load sensing unit 47a and a rear load sensing unit 47b disposed, respectively, at a front portion and a rear portion in the seat cushion 17, and arranged to sense a load applied by a seat occupant to seat cushion 17 at the front portion and rear portion, respectively. The front and rear load sensing units 47a and 47b are buried in seat cushion 17 near the upper surface in a manner not to provide uncomfortable feeling to a seat occupant.

Seat back load sensor 49 of this example includes an upper load sensing unit 49a and a lower load sensing unit 49b disposed, respectively, at an upper portion and a lower portion in seat back 19, and arranged to sense a load applied by a seat occupant to seat back 19 at the upper portion and lower portion, respectively. The upper and lower load sensing units 49a and 49b are buried in seat back 19 near the front surface in a manner not to provide uncomfortable feeling to a seat occupant.

Reversible inner buckle actuator 50 of this example includes an electric motor for driving a pulley or reel 51 to wind and unwind the wire 37 extending from the buckle 35. Seat belt retractor 23 is also of a reversible type as in the first embodiment.

Figure 8:
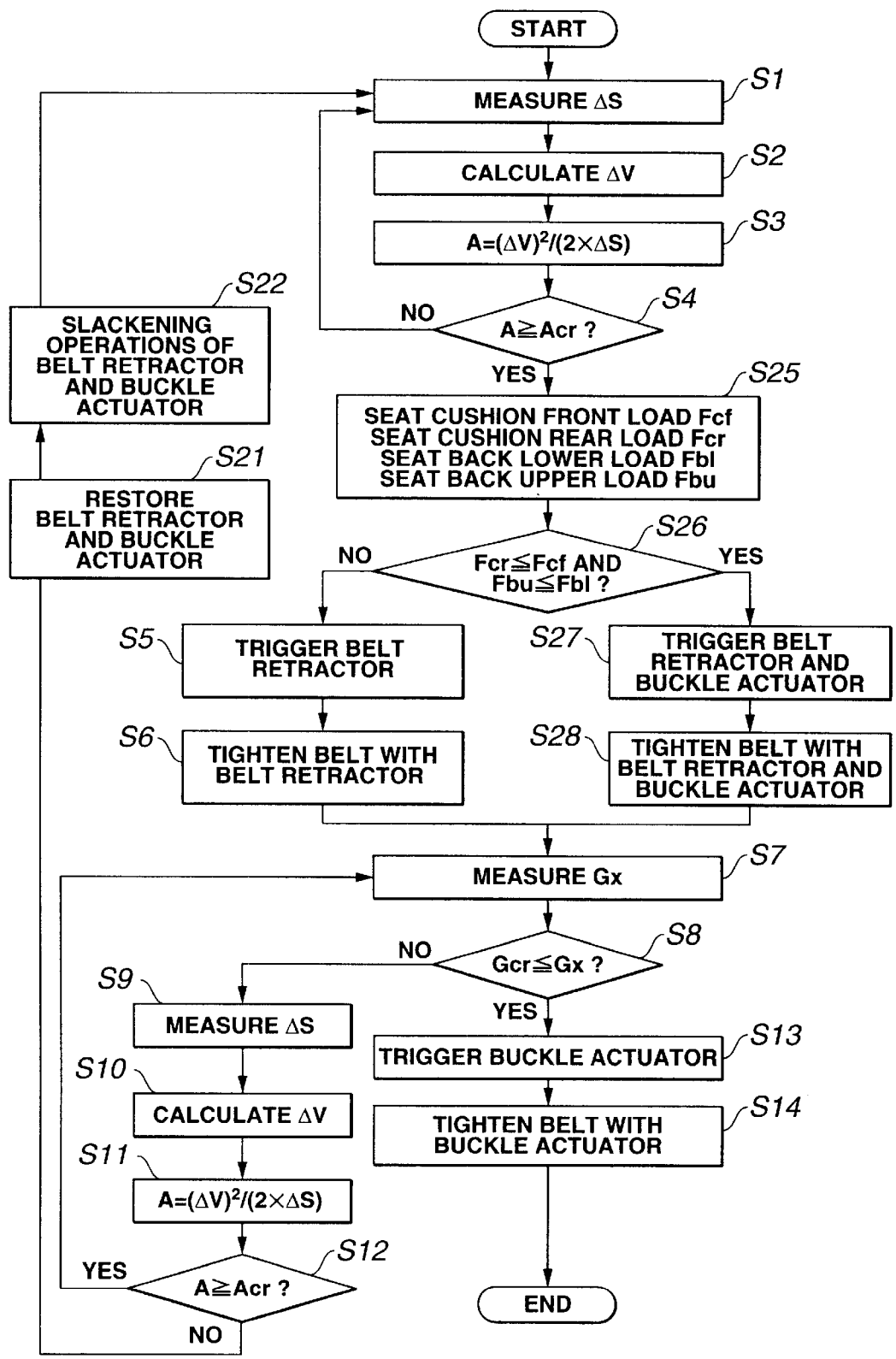
FIG. 8 is a flowchart showing a restraint control procedure according to the second embodiment.

FIG. 8 shows a restraint control procedure according to the second embodiment. Steps S1~S4 and S7~S14 are substantially identical to corresponding steps S1~S4 and S7~S14 shown in FIG. 2. In FIG. 8, steps S25~S28 are added after step S4, steps S5 and S6 are interposed between step S26 and S7, and steps S15 and S16 are replaced by similar steps S21 and S22. Steps S25 and 26 constitute a section to check the posture of a seat occupant.

At step S25 following step S4, controller 11 obtains a seat cushion front load Fcf sensed by front load sensing unit 47a, a seat cushion rear load Fcr sensed by rear load sensing unit 47b, a seat back upper load Fbu sensed by upper load sensing unit 49a and a seat back lower load Fbl sensed by lower load sensing unit 49b.

At step S26, controller 11 compares front and rear seat cushion loads Fcf and Fcr with each other and compares seat back upper and lower loads Fbu and Fbl with each other, and judges that the seat occupant is not in a standard seated posture when seat cushion rear load Fcr is equal to or smaller than seat cushion front load Fcf (Fcr≦Fcf), and at the same time seat back upper load Fbu is equal to or smaller than seat back lower load Fbl (Fbu≦Fbl). This condition for detecting a nonstandard posture is satisfied when, for example, the seat back is leaned more or less and the seat occupant lies sprawled. When a non-standard posture of the seat occupant is detected in this way at step S26, controller 11 proceeds from step S26 to step S27, and produces the trigger signal to reversible buckle actuator 50 as well as the trigger signal to reversible seat belt retractor 23.

At next step S28, in response to the trigger signals from controller 11, seat belt retractor 23 and inner buckle actuator 50 pull the belt section 27 and buckle 35 to tighten shoulder belt 21 and lap belt 29.

When the seat occupant is in the standard sitting posture, this restraint control system proceeds from decision step S26 to step S5, and produces the trigger signal to seat belt retractor 23 only. The trigger signal to buckle actuator 50 is not produced at step S5. At next step S6, seat belt retractor 23 pulls the belt section 27 in response to the trigger signal.

When a collision is warded off, and the program section of steps S9~S12 concludes that the possibility of a rear end collision diminishes, then step S21 is carried out to produce a first restore signal to restore the reversible seat belt retractor 23 and a second restore signal to restore the reversible buckle actuator 50. At next step S22, reversible seat belt retractor 23 pays off belt section 27 in response to the first restore signal, and reversible buckle actuator 50 pays off the buckle wire 37 in response to the second restore signal. As a result, this restraint force control system slackens the shoulder belt 21 and lap belt 29 to reduce or eliminate uncomfortable restraint force, and continue to reduce an impact to the seat occupant with shoulder belt 21 and lap belt 29 with adequate slack.

Figure 9:
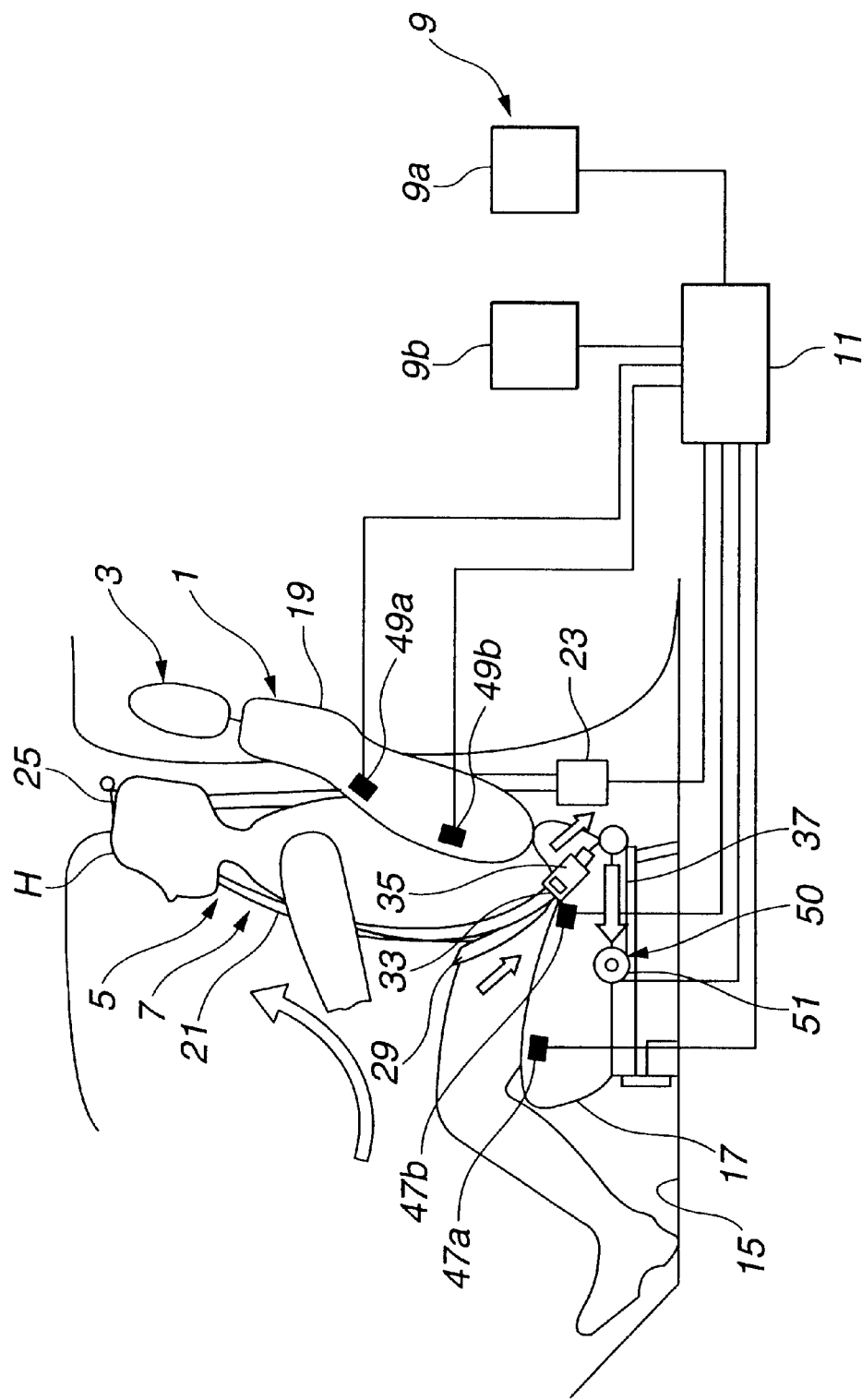
FIGS. 9~11 are views for illustrating operations of the restraint system of FIG. 7.

When the driver is not in the normal standard posture, inner buckle actuator 50 is triggered to pull buckle 35 in the oblique direction intermediate between the rearward direction and downward direction, as shown in FIG. 9, and thereby to increase the belt tension in both of shoulder belt 21 and lap belt 29. Shoulder belt 21 is thus pulled by buckle actuator 50 from the lower side and at the same time by seat belt retractor 23 from the upper side, and the thus-produced tension of shoulder belt 21 forces the chest of the seat occupant rearward toward seat back 19, and the head H toward headrest 3.

The tension of lap belt 29 produced by inner buckle actuator 50 acts on the waist of the seat occupant, and shifts the waist rearward. Lap belt 29 and shoulder belt 21 thus cooperate to straighten the posture and effectively suppress uplift movement of the seat occupant caused at a later stage of a rear end collision at a relatively high relative speed between the host vehicle and a following vehicle.

Figure 10:
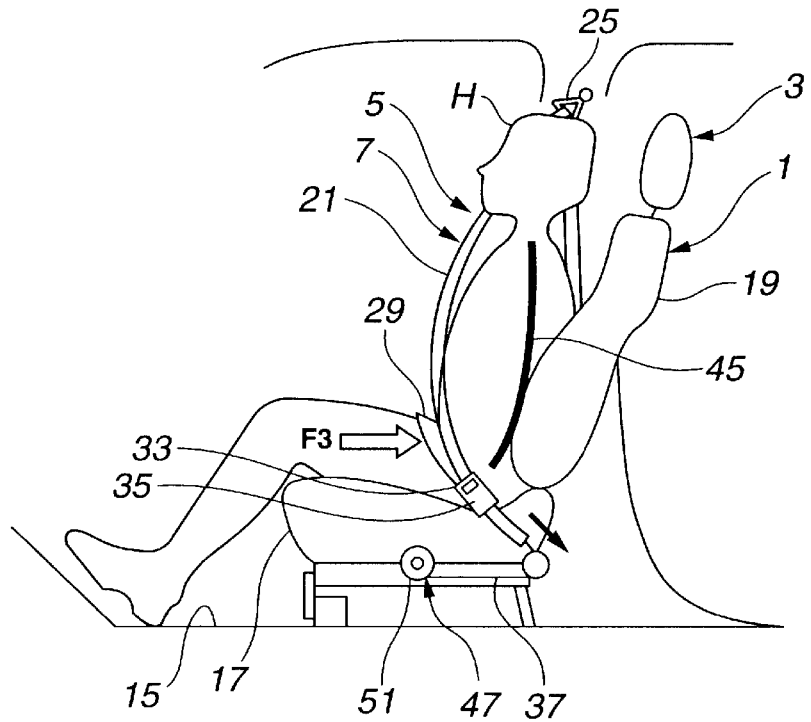
Figure 11:
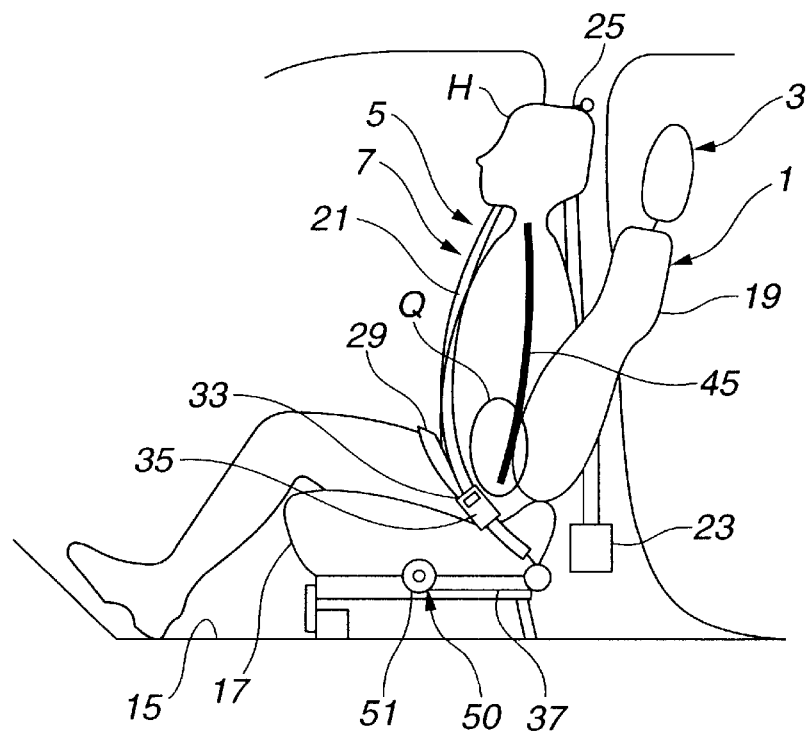
Figure 12:
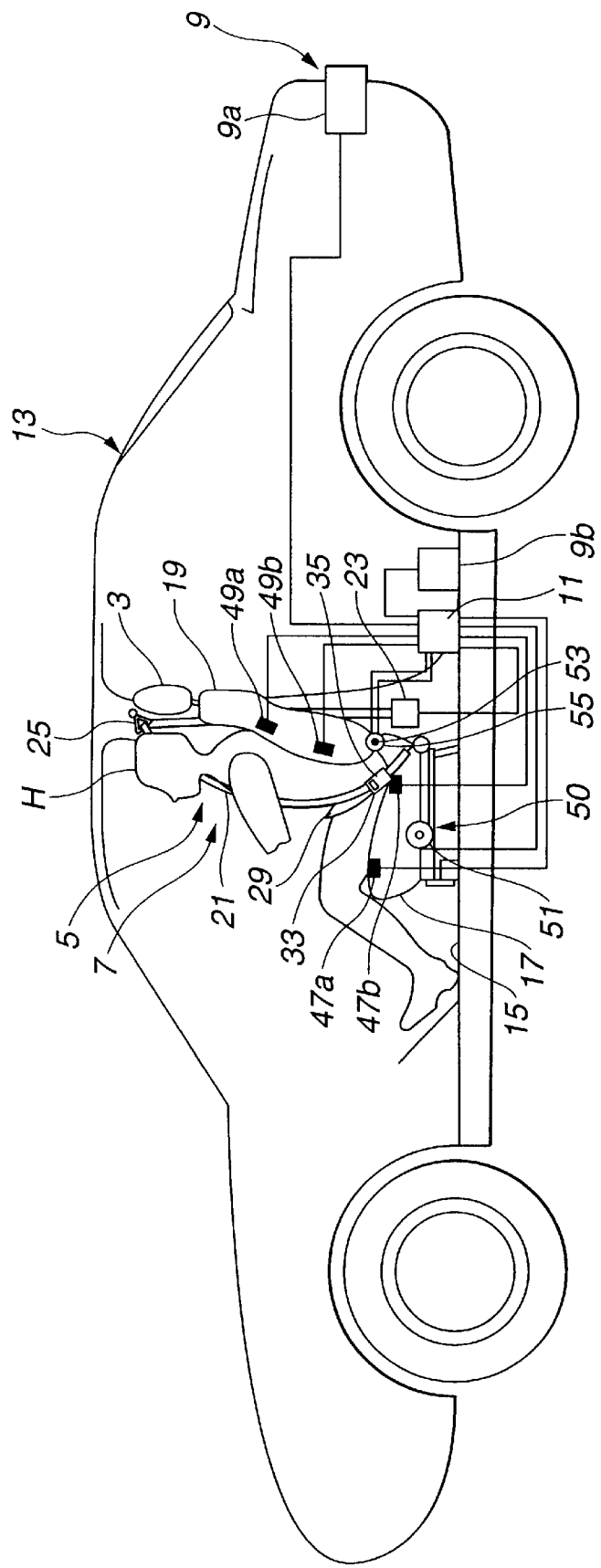
FIG. 12 is a schematic view showing a vehicle equipped with a restraint system according to a third embodiment of the present invention.

The tension of lap belt 29 produces a rearward restraint force F3 shown in FIG. 10 acting to the lower portion of the spine so as to straighten the curved lower spine portion Q. With the lap belt tension and the displacement of buckle 35, this restraint system can effectively correct the posture of the seat occupant and thereby reduce an impact to the neck against upthrust movement in case of a rear end collision.

FIGS. 12~16 show a vehicle equipped with a restraint system according to a third embodiment of the present invention. The restraint system of the third embodiment is basically the same as the system of the second embodiment. In the third embodiment, there are further provided a seat back angle sensor 53 and a seat back recliner or reclining mechanism 55 as a seat adjuster.

Seat back recliner mechanism 55 is provided between a frame of seat cushion 17 and a frame of seat back 19, and arranged to recline seat back 19 back and forth relative to seat cushion 17. Seat back recliner mechanism 55 of this example has left and right mechanisms each disposed between the left or right lower end of the seat back frame and the rear end of the seat cushion frame, to pivotally support seat back 19 on seat cushion 17. Seat back recliner-mechanism 55 serves as a seat adjuster for adjusting the seat back angle toward a reference angle when the seat back angle sensed by seat back angle sensor 53 is equal to or greater than the reference angle.

Seat back angle sensor 53 is provided in reclining mechanism 55, and designed to sense the angle of seat back 19. In this example, reclining mechanism 55 includes a cushion side member or plate attached to the seat cushion frame and a seat back side member or plate attached to the seat back frame, and the seat back angle sensor 53 includes a rotary potentiometer provided between the cushion side member and the seat back side member.

Figure 13:
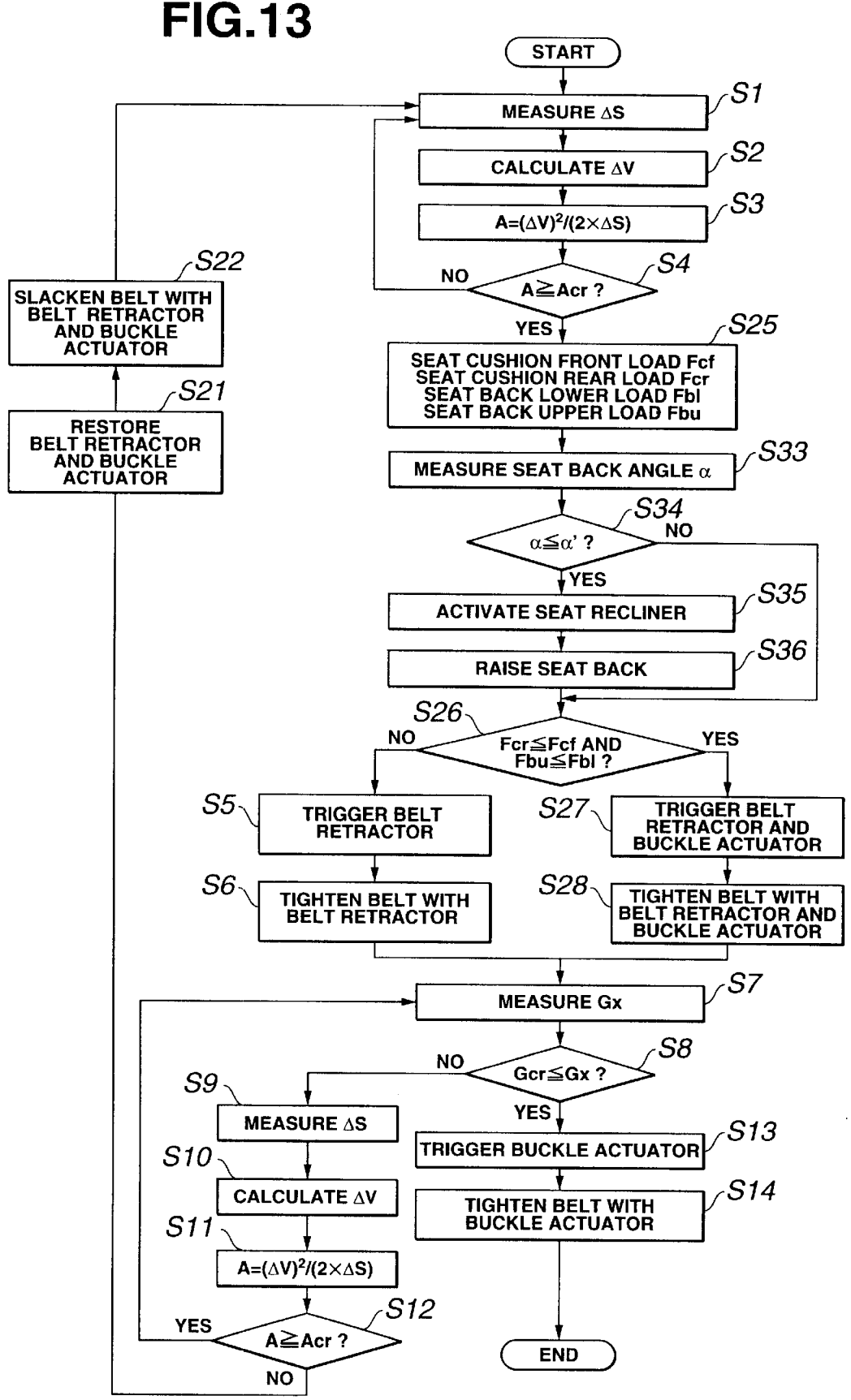
FIG. 13 is a flowchart showing a restraint control procedure according to the third embodiment.

FIG. 13 shows a restraint control procedure according to the third embodiment. Steps S33~S36 are interposed between step S25 and S26. In the other points, FIG. 13 is substantially identical to FIG. 8.

Step S33 is a step to measure the seat back angle of seat back 19. The actual seat back angle $\alpha'$ is determined from the signal from seat back angle sensor 53. Step S34 compares the sensed actual seat back angle $\alpha'$ with a reference angle a stored in a memory section in controller 11. When the sensed actual seat back angle $\alpha'$ is equal to or greater than the reference angle $\alpha$ ($\alpha \leq \alpha'$), controller 11 considers that seat back 19 is reclined backward beyond the reference, and proceeds from step S34 to step S35 to produce an actuation signal to command a forward rotation of seat back 19 to raise seat back 19. In response to this actuation signal, electric seat reclining mechanism 55 rotates seat back 19 forward and raises seat back 19 to the reference angle a at step S36.

Figure 14:
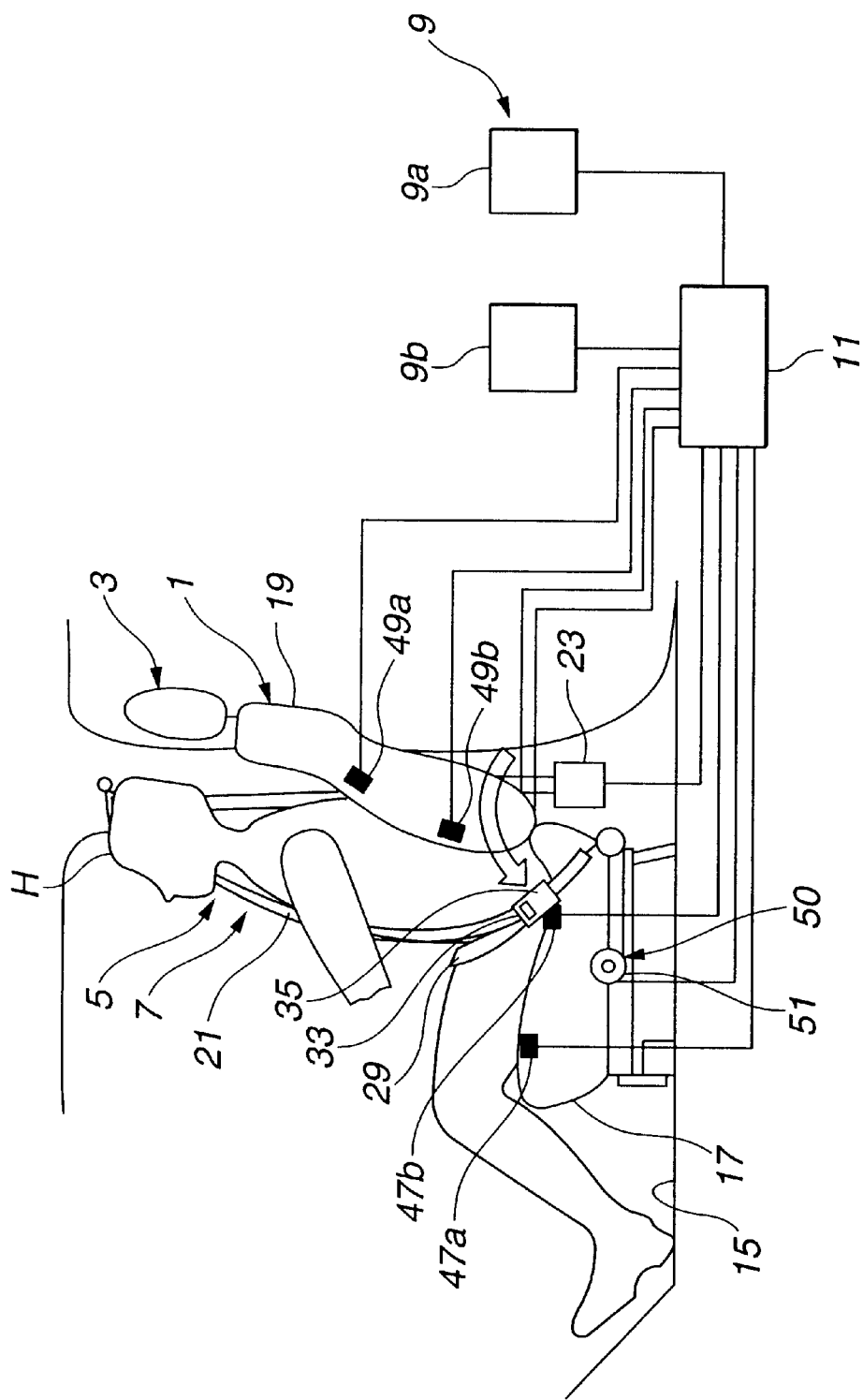
FIGS. 14~16 are views for illustrating operations of the restraint system of FIG. 12.

Therefore, seat back 19 is rotated, as shown in FIG. 14, in a forward direction from a leaning position toward an upright position so as to push the back of a seat occupant. As a result, this restraint control system can reduce an impact to the neck effectively with headrest 3 from the beginning of a rear end collision, by the forward rotation of seat back 19 and the belt tightening operation by seat belt retractor 23 alone or by seat belt retractor 23 and buckle actuator 50 in combination.

Figure 15:
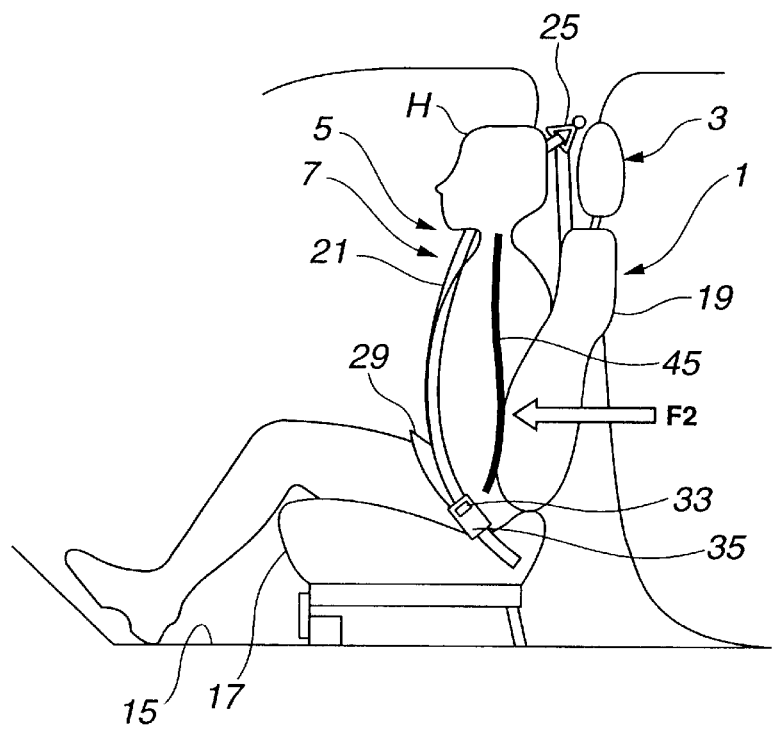
Figure 16:
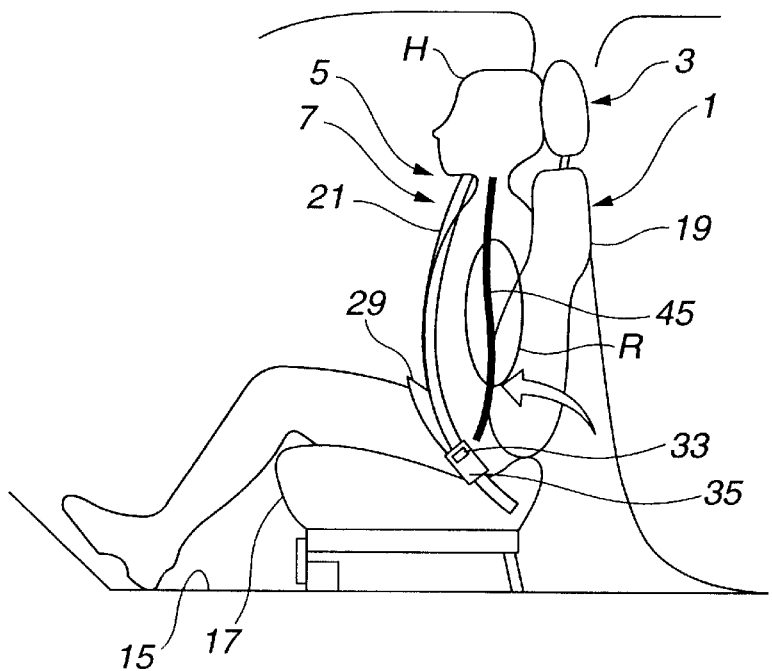

At the same time, the lower portion of seat back 19 pushes the curved lower portion R of the spine with a forward load F2 as shown in FIG. 15, and helps straighten the spine as shown in FIG. 16 to reduce an impact to the neck by suppressing upthrust movement in a rear end collision.

Seat back movement at S36 serves as a warning signal to directly alert the driver to the imminence of a rear end collision, and prompts an avoiding action.

This embodiment is applicable to a vehicle seat having a headrest adjusting system to move a headrest toward the head H of a seat occupant to reduce an impact to the neck by utilizing a restraint force applied to the seat back by rearward movement of the seat occupant at the time of a rear end collision. In this case, this embodiment can improve the restraining function in cooperation with such a head rest adjusting system. This restraint system raises seat back 19 at an earlier stage so that the distance from seat back 19 to the chest of the seat occupant is reduced earlier. Thus, this restraint system decreases the distance from the chest to a pressure sensing unit buried in seat back 19. Therefore, the pressure sensing unit can detect the load of the seat occupant earlier, and initiate the headrest adjusting operation promptly to reduce an impact to the neck of the seat occupant. Thus, the restraint system of this embodiment can cause the pressure sensing unit to initiate the headrest adjusting operation earlier even when the pressure sensing unit is buried deep in the seat back to improve the comfort of the seat occupant.

Figure 17:
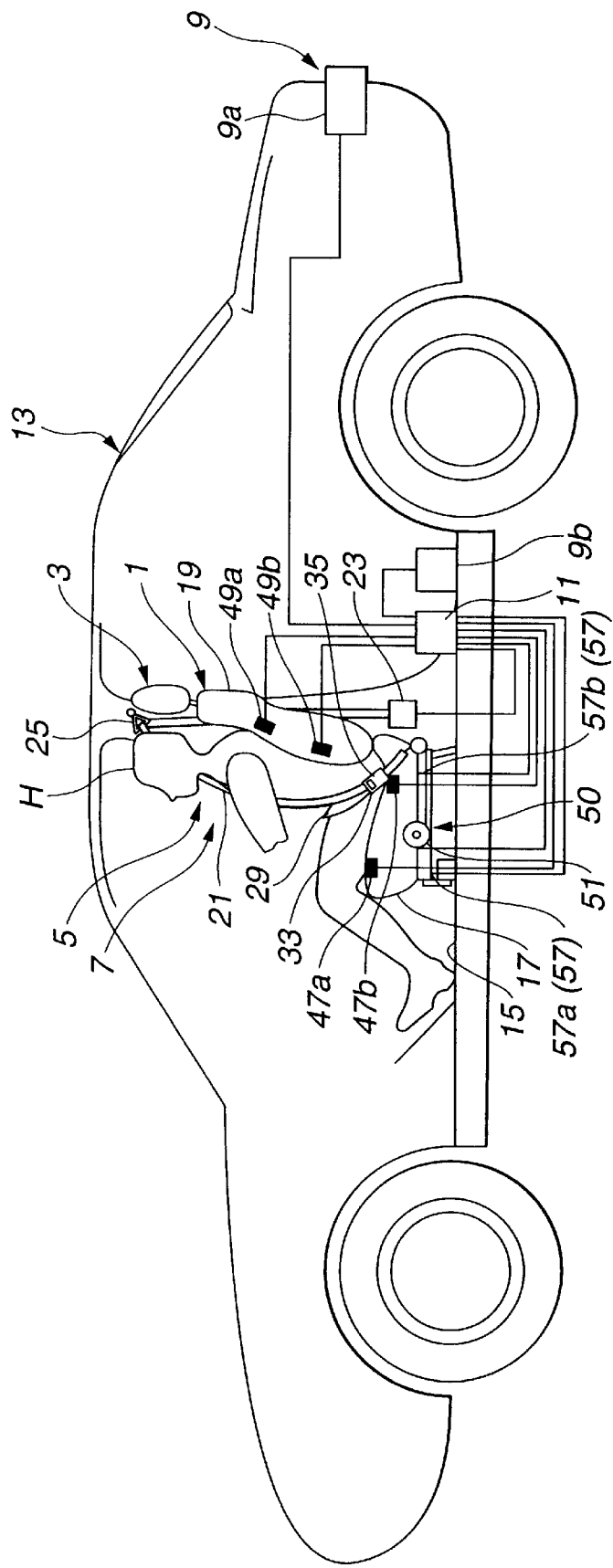
FIG. 17 is a schematic view showing a vehicle equipped with a restraint system according to a fourth embodiment of the present invention.
Figure 18:
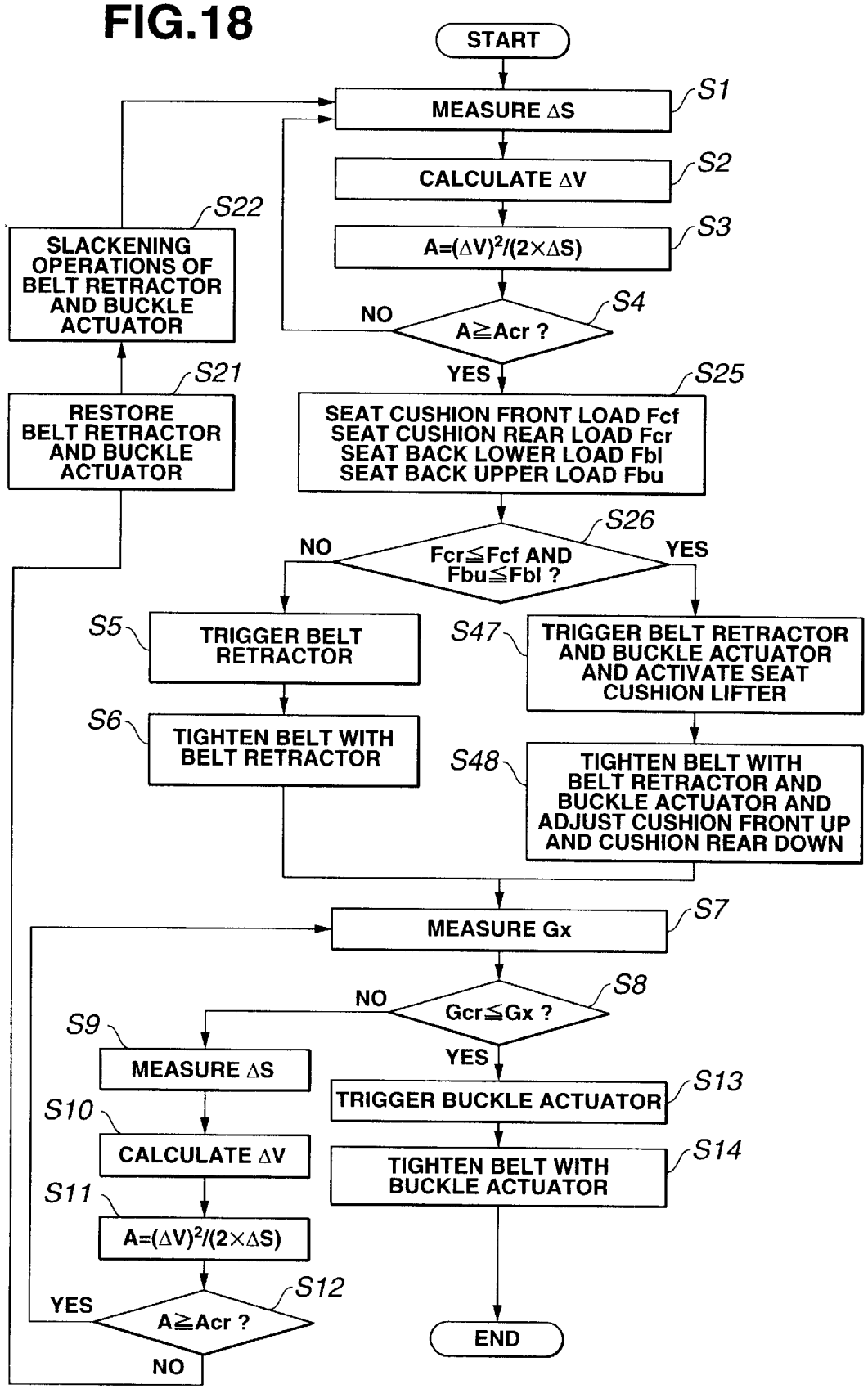
FIG. 18 is a flowchart showing a restraint control procedure according to the fourth embodiment.
Figure 19:
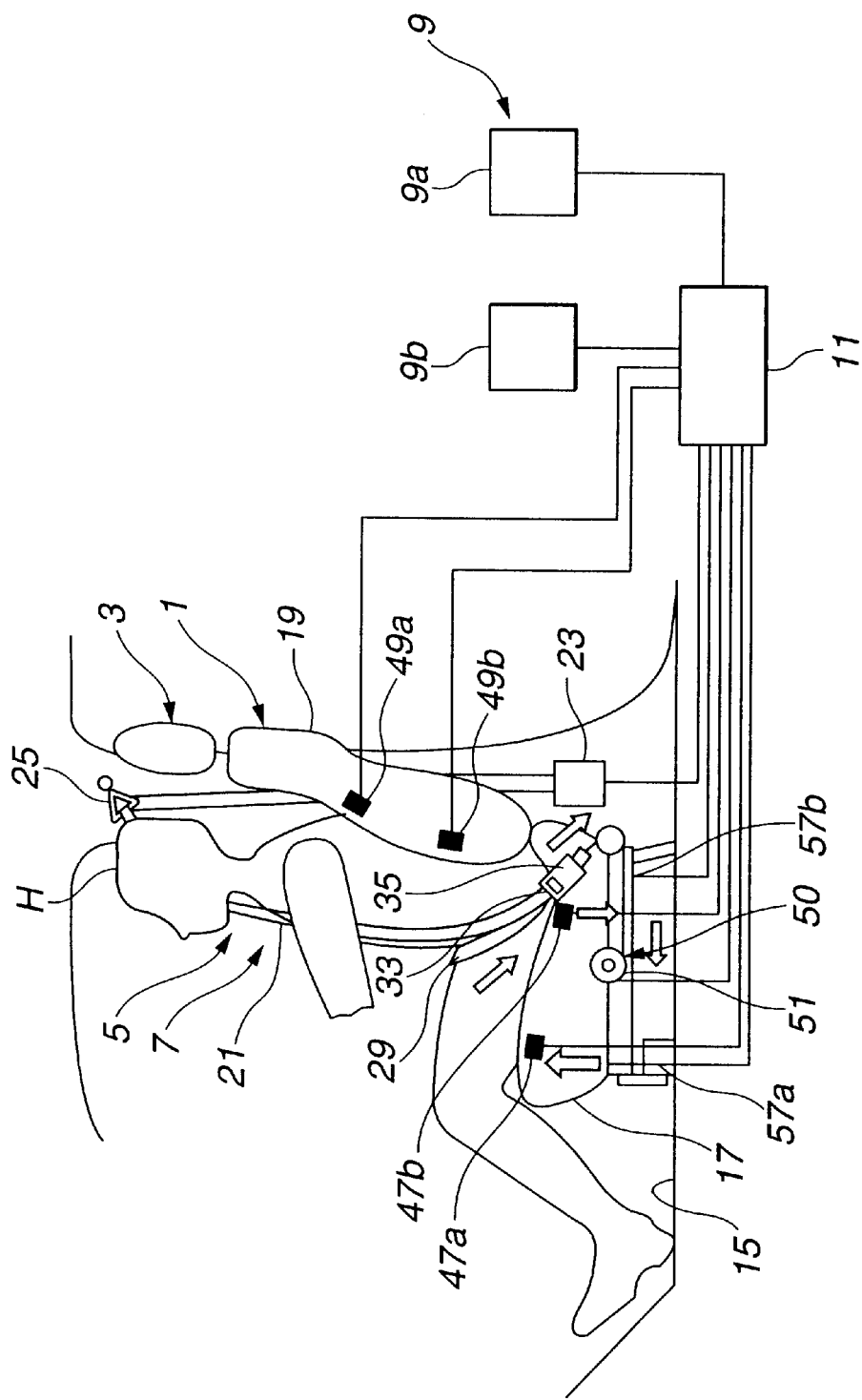
FIG. 19 is a view for illustrating operations of the restraint system of FIG. 17.

FIGS. 17~19 show a vehicle equipped with a restraint system according to a fourth embodiment of the present invention. The restraint system of the fourth embodiment is basically the same as the system of the second embodiment. In the fourth embodiment, there is further provided a seat adjusting mechanism in the form of a seat cushion lifter 57.

Seat cushion lifter 57 of this example includes a front lifting unit 57a and a rear lifting unit 57b capable to moving front and rear portions of seat cushion 17 up and down independently. In this example, the cushion lifter 57 is of an electric type powered by electricity.

FIG. 18 is a flowchart showing a restraint control procedure according to the fourth embodiment. Steps S27 and S28 of FIG. 8 are replaced by steps S47 and S48. In the other steps, FIG. 18 is substantially identical to FIG. 8.

If a seat occupant is not in the standard posture, and hence the answer of step S26 is affirmative, controller 11 proceeds from step S26 to step S47, and produces a front lifter up command signal and rear lifter down command signal in addition to the first trigger signal to trigger seat belt retractor 23, and the second trigger signal to trigger buckle actuator 50.

At next step S48, belt retractor 23, buckle actuator 50 and seat cushion lifter 57 are all activated to restrain the seat occupant tightly and correct the posture. In this case, front lifting unit 57a raises the front portion of seat cushion 17 and rear lifting unit 57b lowers the rear portion of seat cushion 17, as shown by arrows in FIG. 19.

Therefore, seat cushion 17 is adjusted to a form sloping upward toward the front end of seat cushion 17. The seat cushion sloping down to the rear helps the seat belt system to correct the posture of the seat occupant with the lap belt tension, and thereby suppresses undesired uplift movement of the seat occupant at a later stage of a rear end collision of a higher relative speed.

Figure 20:
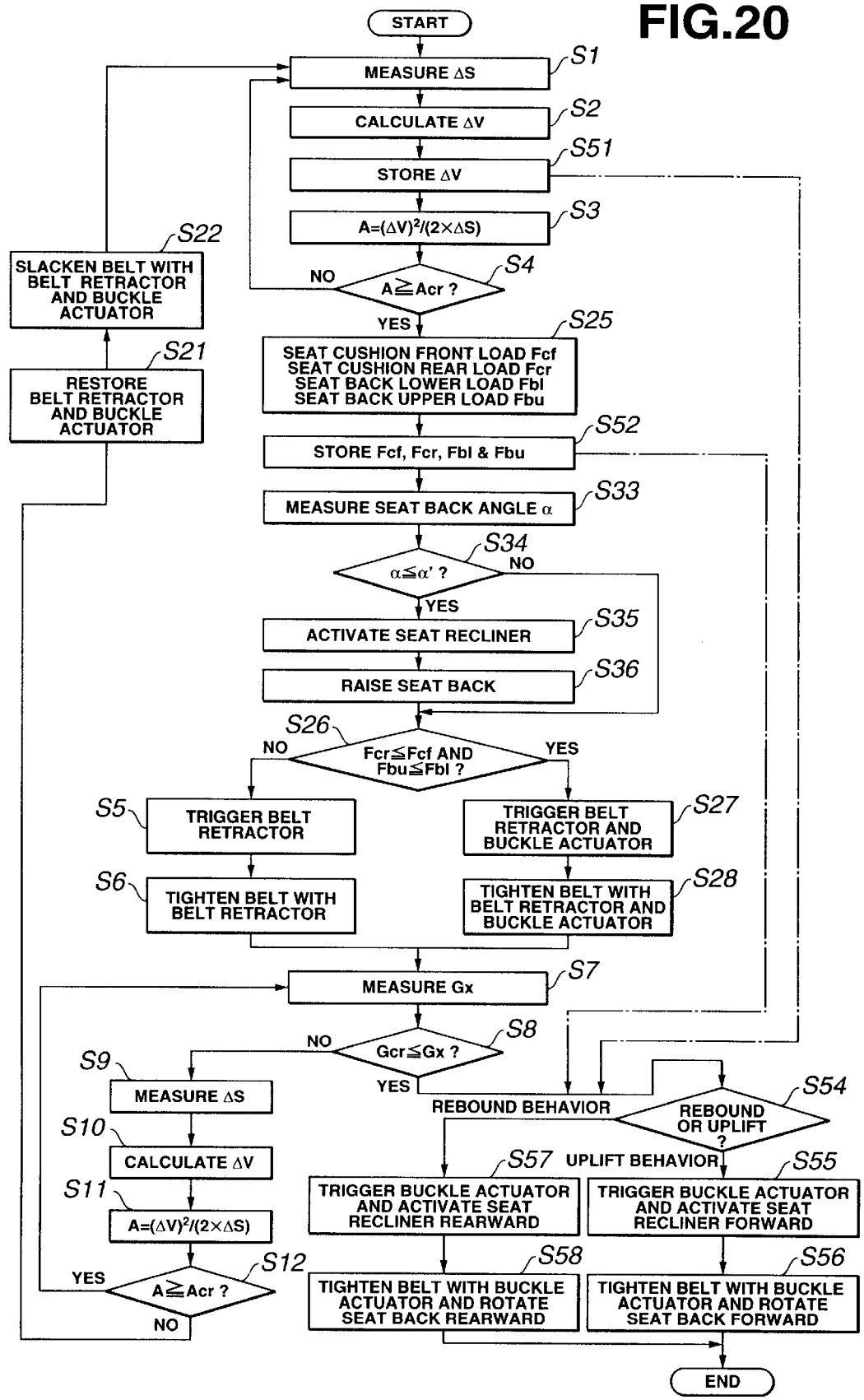
FIG. 20 is a flowchart showing a restraint control procedure according to a fifth embodiment.
Figure 21:
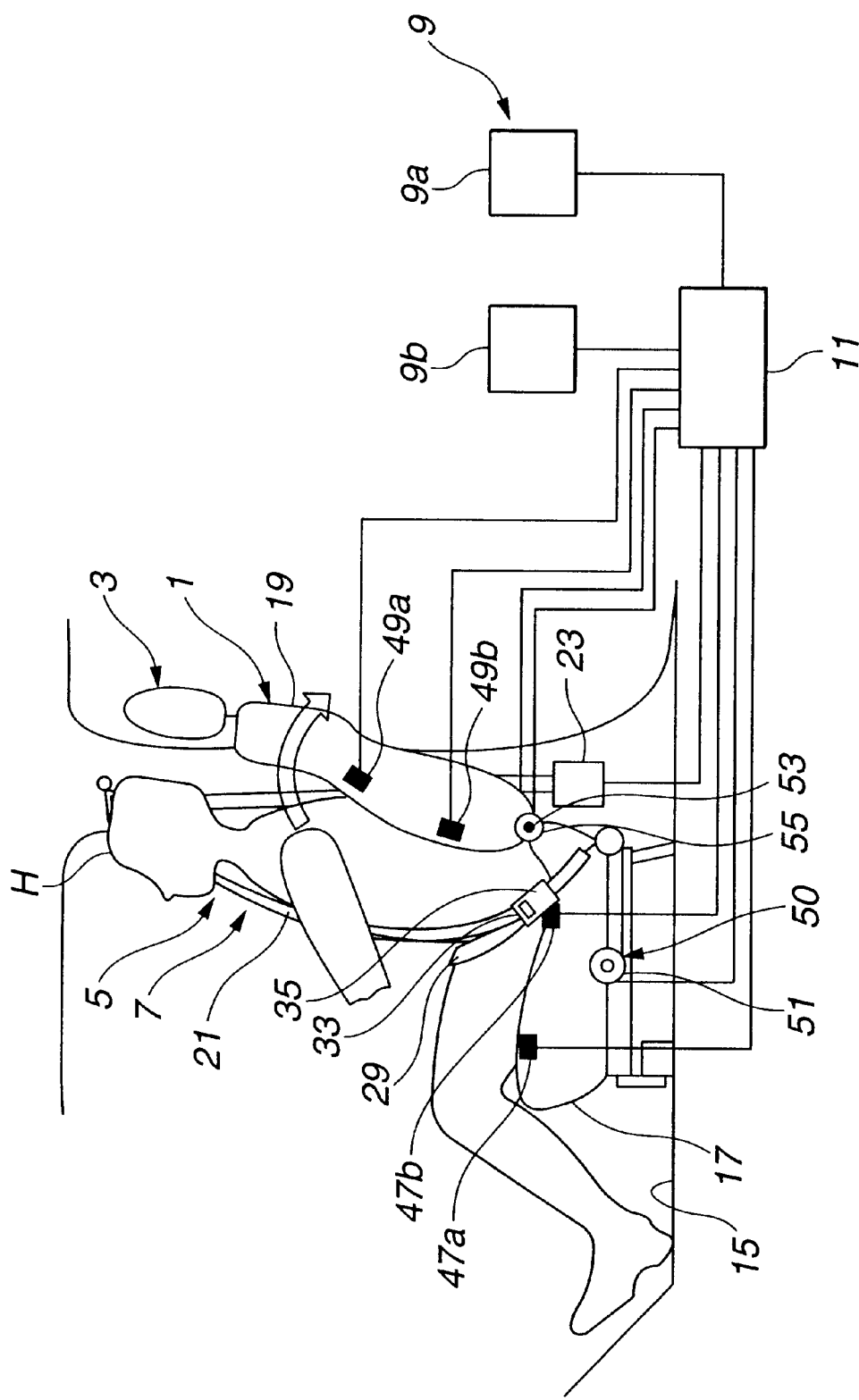
FIGS. 21 and 22 are views for illustrating operations of a restraint system according to the fifth embodiment.
Figure 22:
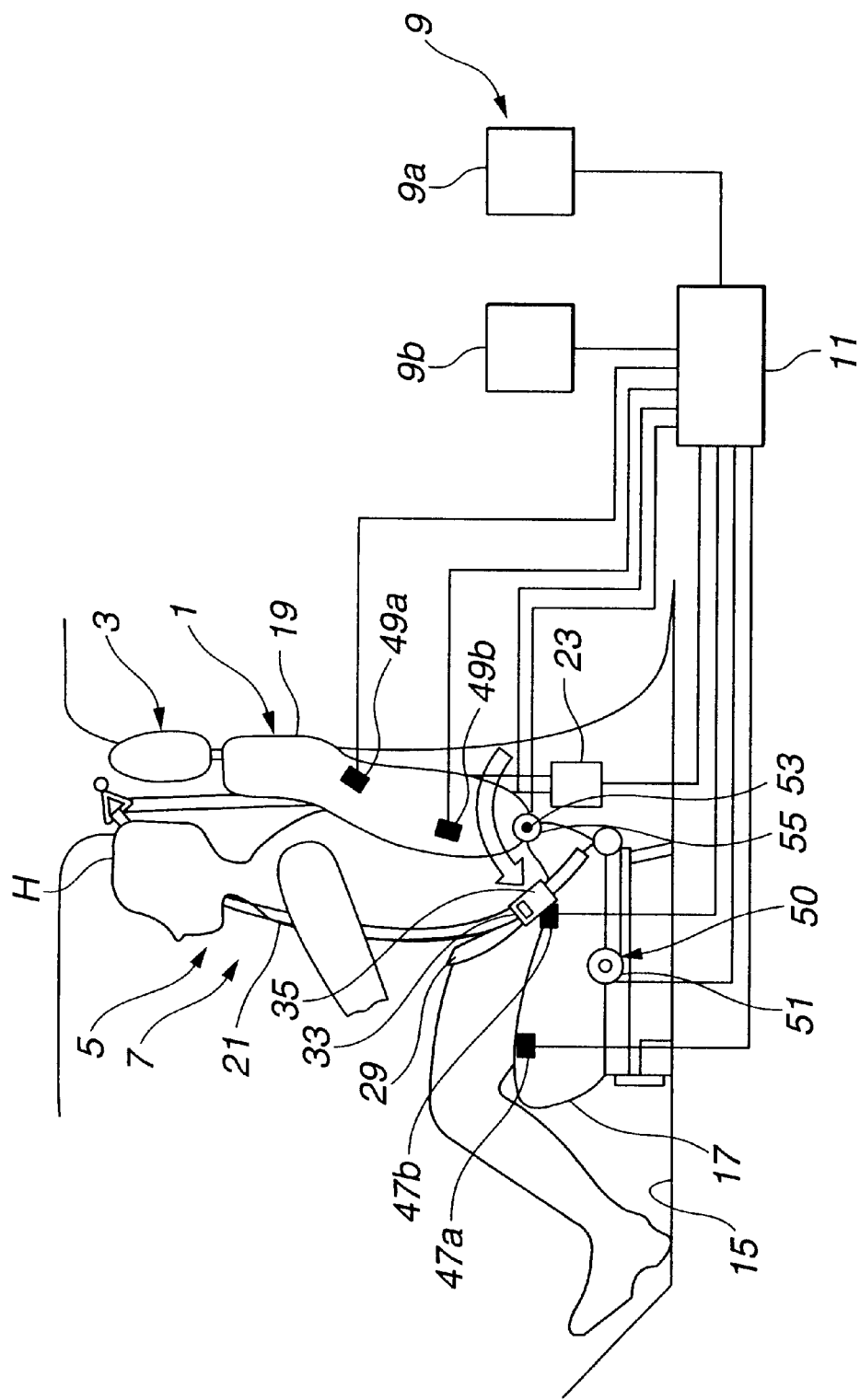

FIGS. 20~22 show a restraint system according to a fifth embodiment of the present invention. The restraint system of the fifth embodiment is almost the same as the system shown in FIG. 12 of the third embodiment. A vehicle of the fifth embodiment includes the components shown in FIG. 12 as in the third embodiment.

FIG. 20 is a flowchart showing a restraint control procedure of the fifth embodiment. FIG. 20 is different from FIG. 13 of the third embodiment in that the after-collision section of steps S13 and S14 is replaced by steps S54~S58, and steps S51 and S52 are added.

When the occurrence of a rear end collision is detected at step S8, controller 11 proceeds from step S8 to step S54 to determine whether a seat occupant is subjected to rebound movement or uplift movement (upward slipping movement), by using a value of the relative speed ΔV stored at step S51 (next to step S2) just before the occurrence of the rear end collision, and values of the seat cushion loads Fcf and Fcr and seat back loads Fbl and Fbu stored at step S52 following step S25. Controller 11 estimates the weight of the seat occupant from the loads Fcf, Fcr, Fbl and Fbu, and predicts a behavior of the seat occupant at the later stage of a rear end collision from the weight and the relative speed ΔV immediately before the collision.

Figure 29:
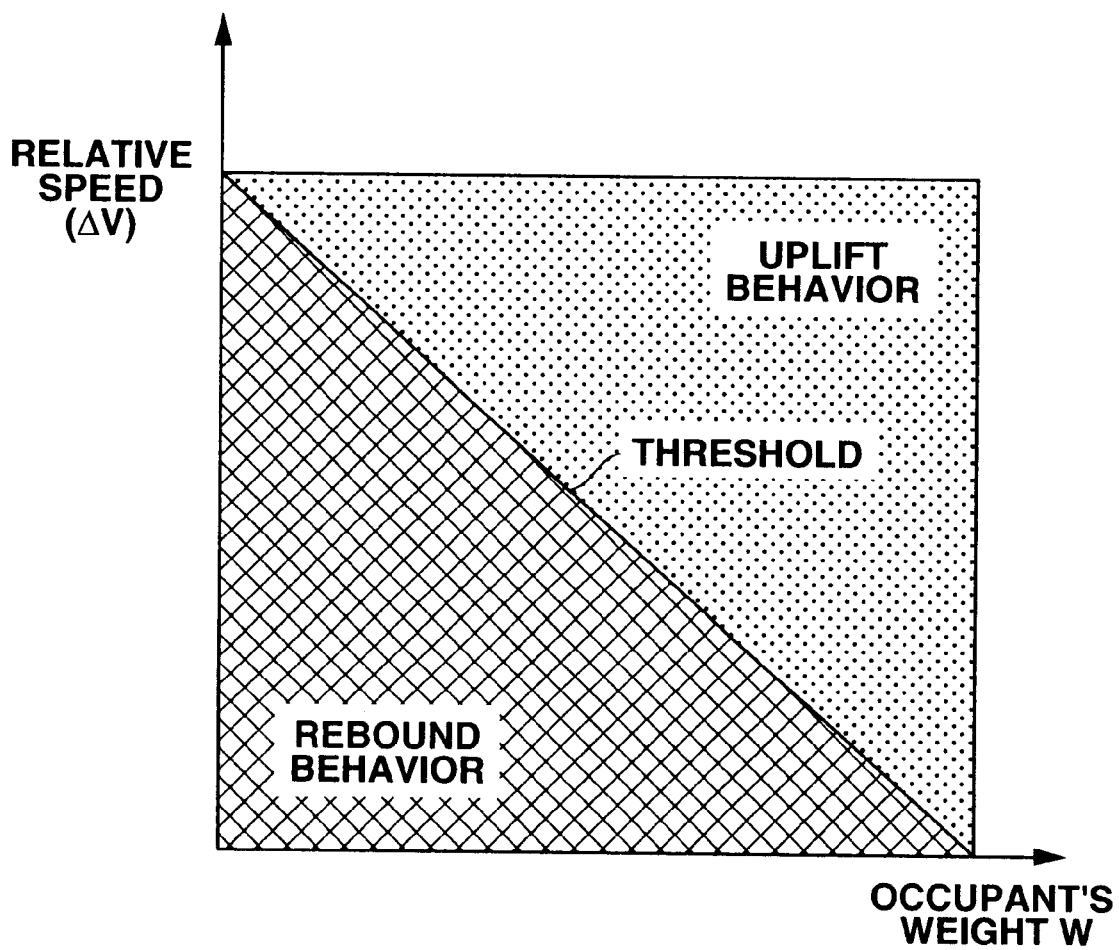
FIG. 29 is a graph showing a map for discriminating a rebound region and an uplift region used in the process of FIG. 20.

The weight W of an seat occupant is calculated by summation of loads Fcf, Fcr, Fbl and Fbu. That is, W=Fcf+Fcr+Fbl+Fbu. In accordance with the weight W and relative speed ΔV, controller 11 determines whether a current condition is in a region of rebound behavior or in a region of uplift behavior in a map shown in FIG. 29 stored in controller 11. In this example, the map is stored in the form of a threshold dividing the rebound region and uplift region.

In the case of the uplift behavior, controller 11 proceeds from step S54 to step S55, and performs operations to produce the trigger signal to trigger inner buckle actuator 50, and the forward rotation command signal to actuator electric seat recliner 55. At next step S56, therefore, inner buckle actuator 50 pulls lap belt 29, and electric seat recliner 55 rotates seat back 19 forward.

In the case of the rebound behavior, controller 11 proceeds from step S54 to step S57, and performs operations to produce the trigger signal to trigger inner buckle actuator 50, and the rearward rotation command signal to actuate electric seat recliner 55. At next step S58, therefore, inner buckle actuator 50 pulls lap belt 29, and electric seat recliner 55 rotates seat back 19 rearward.

By rotating seat back 19 rearward as shown by an arrow in FIG. 21 after the occurrence of a rear end collision, this restraint system can effectively prevent rebound movement of a seat occupant in the case of a rear end collision at a lower relative speed. In the case of a rear end collision at a higher relative speed, this restraint system can effectively prevent uplift movement of a seat occupant by rotating seat back 19 forward as shown by an arrow in FIG. 22. The restraint system according to the fifth embodiment can provide other effects in the same manner as in the third embodiment.

Figure 23:
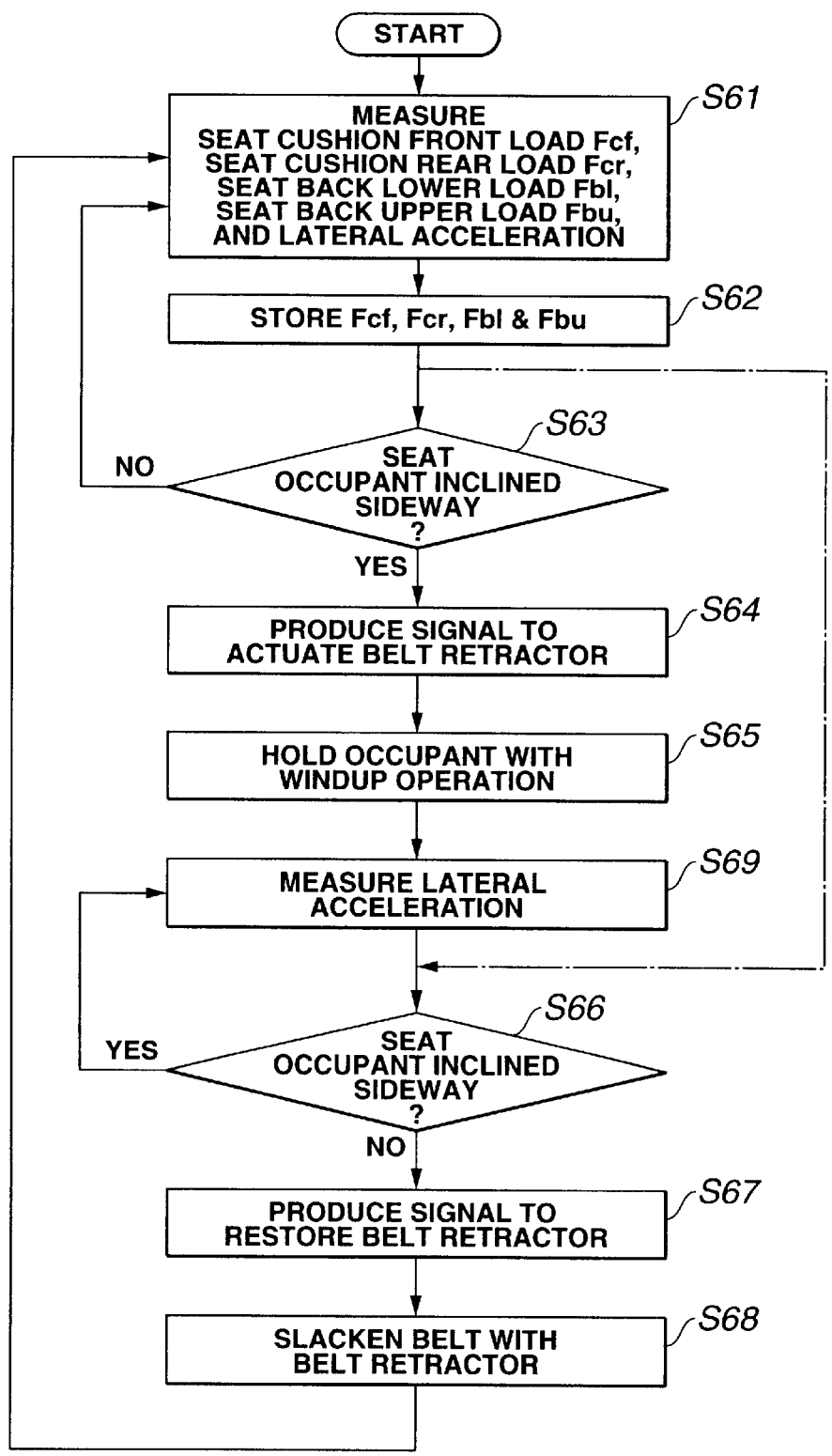
FIG. 23 is a flowchart used in a sixth embodiment of the present invention.
Figure 24:
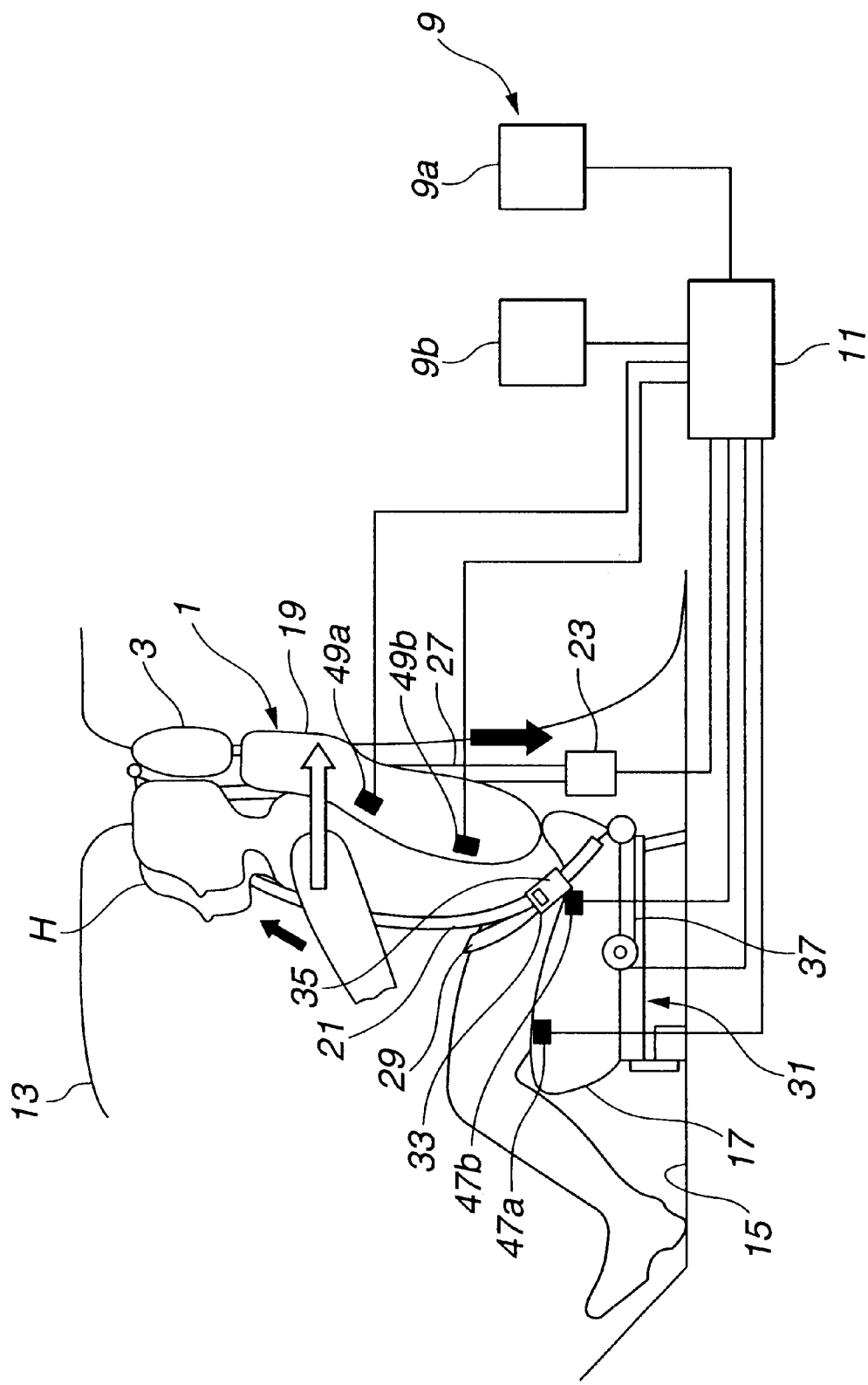
FIGS. 24 and 25 are views for illustrating operations of a restraint system according to the sixth embodiment.
Figure 25:
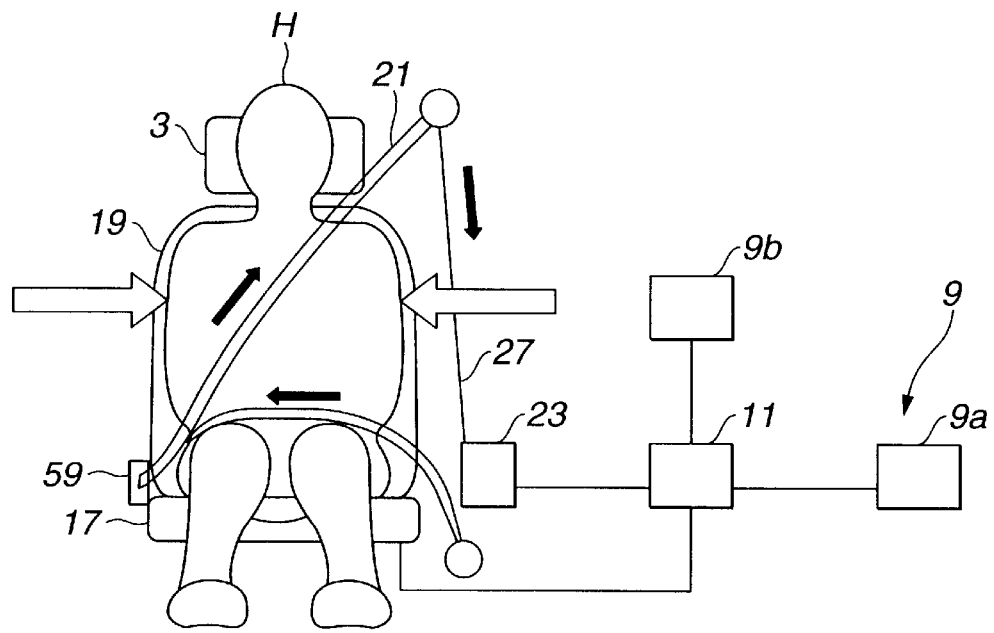
Figure 26A:
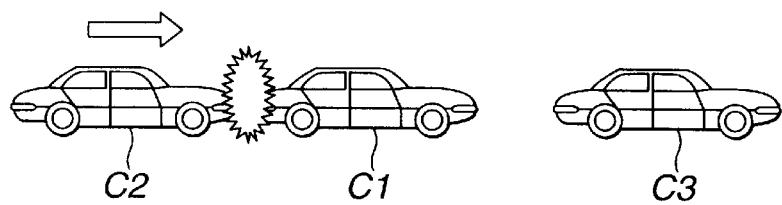
FIGS. 26A and 26B are views for illustrating a front end collision following a rear end collision which can be sensed by a restraint system according to a seventh embodiment.
Figure 26B:
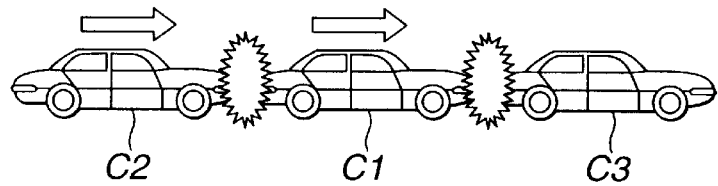

FIGS. 23~25 shows a restraint system according to a sixth embodiment. The restraint system of the sixth embodiment is almost the same as the system shown in FIG. 12 of the third embodiment. A vehicle of the sixth embodiment includes the components shown in FIG. 12 as in the third embodiment. In the sixth embodiment, there is further provided a lateral acceleration sensor 59 for sensing the lateral acceleration of the vehicle. It is optional to use, as lateral acceleration sensor 59, a constituent part used as the unit 9b for sensing the longitudinal acceleration. Alternatively, lateral acceleration sensor 59 may be constructed as a component different from the longitudinal acceleration sensing unit 9b.

FIG. 23 shows a control procedure performed as an interrupt routine with respect to the flowchart of FIG. 13. Step S61 is for measurement of vehicle lateral acceleration sensed by lateral acceleration sensor 59 as well as seat cushion front load Fcf and seat cushion rear load Fcr of seat cushion 17 and seat back lower load Fbl and seat back upper load Fbu of seat back 19.

Then, at step S62, the four values of loads Fcf, Fcr, Fbl and Fbu are stored. At a next step S63, controller 11 determines whether the posture of a seat occupant is deviated, by comparing the sensed vehicle lateral acceleration and stored values of loads Fcf, Fcr, Fbl and Fbu with values stored as data base values in controller 11. Step S63 is designed to detect a sidewise deviated posture of a seat occupant during cornering operation of the vehicle, and produce an affirmative answer when the seat occupant is inclined sideway and the head H of the seat occupant is deviated from the position of headrest 3.

When the seat occupant is inclined sideway and the answer of step S63 is affirmative, controller proceeds from step S63 to step 64, and produces an actuation signal to actuate the seat belt retractor 23 for belt windup operation. At step S65, reversible seat belt retractor 23 winds up belt section 27 to hold the seat occupant.

At step S69 following step S65, vehicle lateral acceleration is measured again. Then, at a next step S66, controller 11 determines whether the posture of the seat occupant is deviated, by comparing the sensed vehicle lateral acceleration measured at step S69 and stored values of loads Fcf, Fcr, Fbl and Fb stored at step 562 with values preliminarily stored as data base values in controller 11 in the same manner as in step S63. Controller 11 returns from step S66 to step S69 when the occupant is in the sidewise deviated posture, and proceeds from step S66 to step S67 when the posture is not deviated sideway. At step S67, controller 11 produces a signal to restore reversible seat belt retractor 23.

At step S68, reversible seat belt retractor 23 unwinds belt section 27 and thereby provide a slack to the seat belt.

Therefore, if the upper torso of a seat occupant is inclined sideway during cornering operation of the vehicle, this restraint system pushes the chest of a seat occupant to seat back 19 by the belt tension of shoulder belt 21 as shown in FIG. 24, and thereby holds the occupant as shown by arrows in FIG. 25 during cornering operation to hold the head H at a correct position relative to headrest 3 to reduce an impact to the neck in case of a rear end collision during cornering.

Figure 27:
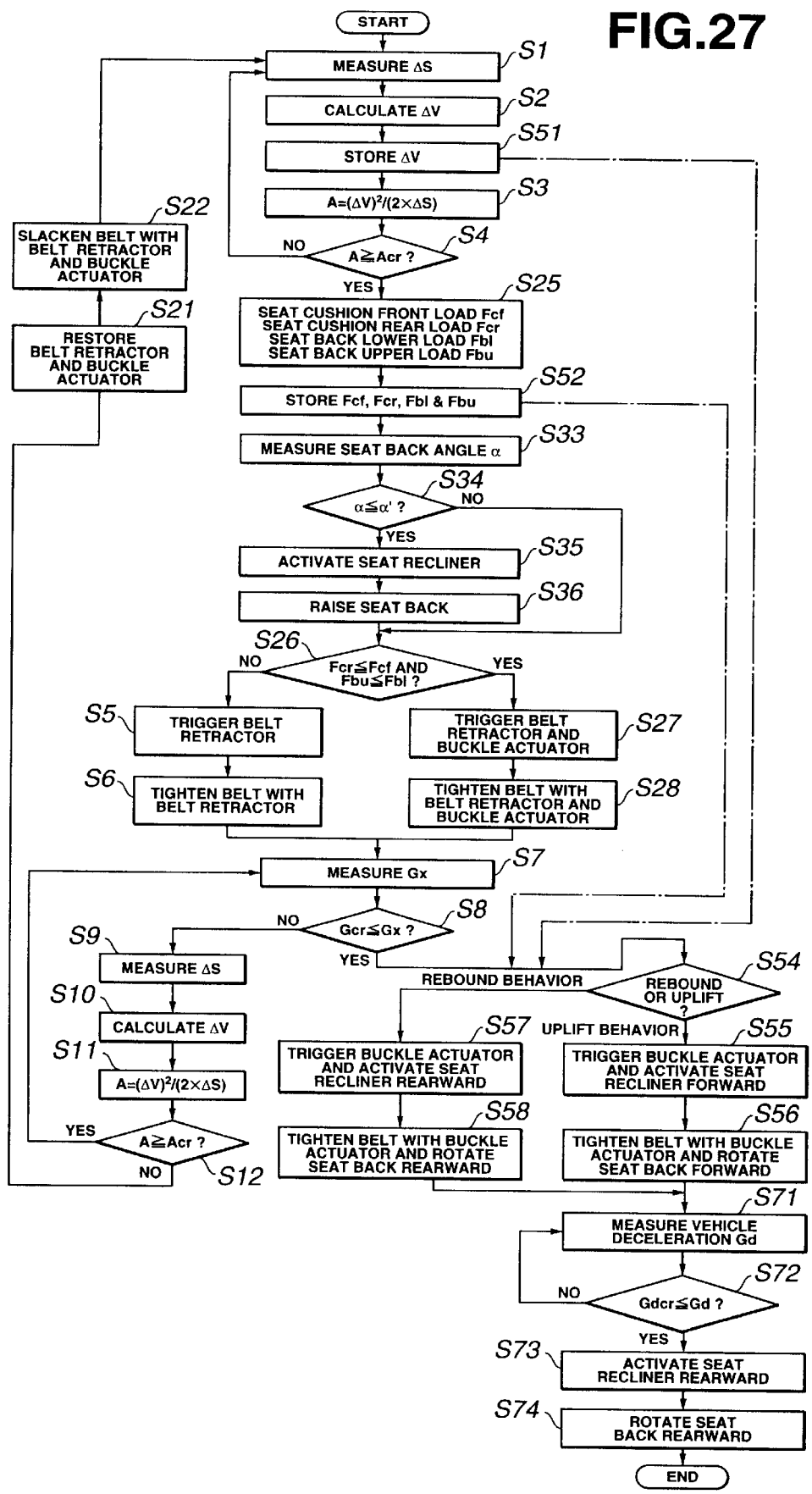
FIG. 27 is a flowchart showing a restraint control procedure according to the seventh embodiment.
Figure 28:
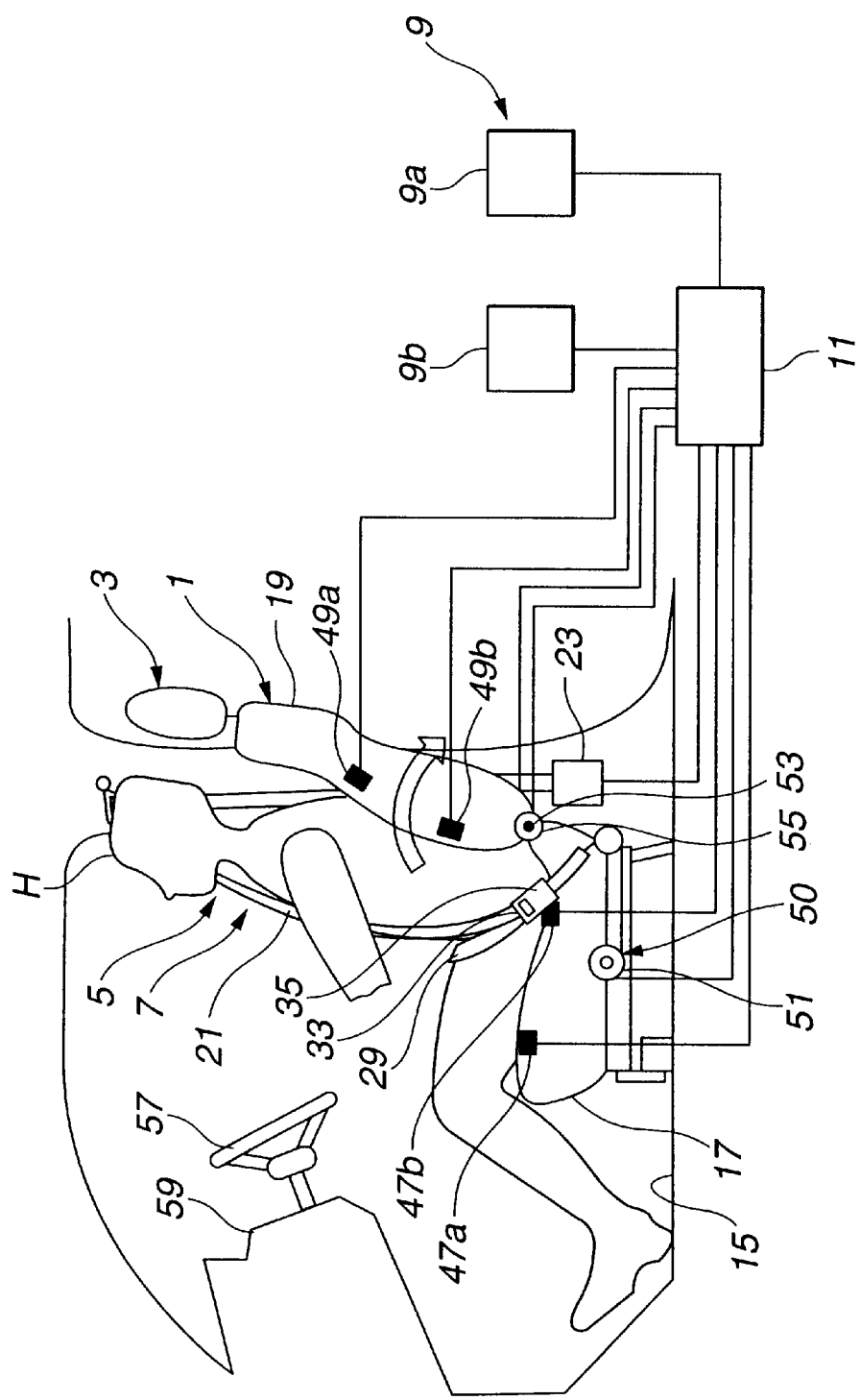
FIG. 28 is a view for illustrating operations of the restraint system of the seventh embodiment.

FIGS. 26A, 26B, 27 and 28 show a restraint system according to a seventh embodiment of the present invention. The restraint system of the seventh embodiment is almost the same as the system of the fifth embodiment shown in FIGS. 20~22. FIG. 27 is a flowchart of the seventh embodiment which is different from FIG. 20 in the addition of a program section of steps S71~S74 to meet a front end collision following a rear end collision.

In some situations, a front end (frontal) collision might occur after a rear end collision. In an example shown in FIGS. 26A and 26B, a following vehicle C2 first collides against the rear end of a host vehicle C1, and then the host vehicle C2 collides against the rear end of a preceding object C3. The preceding object may be a preceding vehicle or some other object.

After the section of steps S54~S58 after the occurrence of a rear end collision, controller 11 checks the signal of the vehicle longitudinal acceleration sensing unit 9b of the rear end collision sensor 9, and thereby determines a vehicle longitudinal deceleration Gd at step S71. At a next step S72, controller 11 compares measured vehicle deceleration Gd with a reference deceleration value Gdcr stored in controller 11, to examine whether measured deceleration Gd is greater than or equal to the reference value Gdcr (Gd≧Gdcr). If measured deceleration Gd is equal to or greater than reference value Gdcr, then controller 11 judges that a front end collision has occurred and proceeds to step S73 to perform operations to produce a seat back rearward At step S74, therefore, electric seat reclining mechanism 55 receives this command signal and rotates seat back 19 rearward as shown by an arrow in FIG. 28. Even if host vehicle C1 is thrust forward by the rear end collision by following vehicle C2 and collides with the rear end of preceding vehicle C3, this restraint system can lean backward the upper torso of the seat occupant, and thereby prevent the occupant from being moved forward by the impact of the frontal collision of host vehicle C1, and from colliding against a steering wheel 57, an instrument panel 59 and other component in the vehicle.

This application is based on a prior Japanese Patent Application No. 2000-142208 filed in Japan on May 15, 2000.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle comprising:
   a seat comprising a seat cushion and a seat back;
   a headrest mounted on an upper portion of the seat back;
   a restraint system that secures a seat occupant on the seat and restrains the head of the seat occupant toward the headrest and straightens the spine of the seat occupant;
   a sensor that senses a first condition and determines a relative distance from the vehicle which is hereinafter referred to as a host vehicle, to a following vehicle following the host vehicle, and a relative speed of the following vehicle relative to the host vehicle; and
   a controller that:
      calculates a parameter indicative of a deceleration of the following vehicle from the relative distance to the following vehicle and the relative speed of the following vehicle relative to the host vehicle,
      produces a prediction signal indicating a possibility of a rear end collision when the parameter is equal to or greater than a threshold, and
      drives the restraint system in response to the prediction signal,
   wherein the restraint system comprises an upper torso restraint that restrains movement of the chest and a shoulder of the seat occupant, and a first actuator, connected with the upper torso restraint, that produces a restraint force with the upper torso restraint in response to a first trigger signal produced by the controller that drives the restraint system;
   wherein the restraint system further comprises a pelvic restraint that restrains movement of the pelvis of the seat occupant, and a second actuator, connected with the pelvic restraint, that produces a restraint force with the pelvic restraint in response to a second trigger signal produced by the controller; and
   wherein the sensor comprises a rear end collision sensor that comprises a first section that senses a first condition that detects the possibility of a rear end collision of the vehicle and a second section that senses a second condition that detects the occurrence of a rear end collision of the vehicle; and the controller produces a prediction signal when the possibility of a rear end collision is detected, and a collision signal when the occurrence of a rear end collision is detected, and further produces the first trigger signal in response to the prediction signal to tighten the upper torso restraint before the occurrence of a rear end collision, and the second trigger signal in response to the collision signal to tighten the pelvic restraint upon the occurrence of a rear end collision.

2. The vehicle as claimed in claim 1, wherein the upper torso restraint comprises a shoulder belt that restrains a shoulder and the chest of a seat occupant; the first actuator comprises a seat belt retractor that retracts an upper portion of the shoulder belt; and the controller drives the belt retractor and tightens the shoulder belt in response to the first trigger signal.

3. The vehicle as claimed in claim 2, wherein the pelvic restraint comprises a lap belt that extends from a first lateral side to a second lateral side across the lap of a seat occupant; and the second actuator holds a lower portion of the shoulder belt and a first lateral side portion of the lap belt and tightens the lap belt and the shoulder belt in response to the second trigger signal.

4. The vehicle as claimed in claim 3, wherein the lap belt and the shoulder belt are connected with each other, and the second actuator comprises a buckle actuator that increases belt tension of both the lap belt and the shoulder belt in response to the second trigger signal.

5. The vehicle as claimed in claim 4, wherein the first actuator pulls the shoulder belt rearwardly toward a rear of the host vehicle and pushes the upper torso of the seat occupant to the seat back, and the second actuator pulls the lap belt rearwardly toward the rear of the host vehicle and pushes the pelvis of the seat occupant to the seat back.

6. The vehicle as claimed in claim 1, wherein the first section of the rear end collision sensor comprises a distance sensor that senses a distance from the vehicle to a following vehicle behind.

7. The vehicle as claimed in claim 6, wherein the controller is configured to produce a first restore signal when the first parameter becomes smaller than the threshold, and the first actuator is arranged to slacken the upper torso restraint in response to the first restore signal.

8. The vehicle as claimed in claim 6, wherein the second section of the rear end collision sensor comprises a longitudinal acceleration sensor to sense a longitudinal acceleration of the vehicle equipped with the rear end collision sensor; and the controller is configured to produce the collision signal when the longitudinal acceleration is greater than or equal to a threshold acceleration value.

9. The vehicle as claimed in claim 1, wherein the seat comprises a seat adjuster that corrects the posture of a seat occupant by adjusting a condition of the seat in response to an adjuster actuation signal; and the controller produces the adjuster actuation signal in response to the prediction signal before the occurrence of a rear end collision.

10. The vehicle as claimed in claim 9, wherein the seat adjuster comprises a seat back recliner; the vehicle further comprises a seat back angle sensor that detects a reclined condition of the seat back; and the controller produces the adjuster actuation signal to raise the seat back from the reclined condition when the reclined condition is detected.

11. The vehicle as claimed in claim 1, wherein the vehicle comprises a seat back recliner that rotates the seat back in a forward direction and in a rearward direction, and an occupant sensor that senses a weight of a seat occupant; the rear collision sensor senses a relative speed of a following vehicle behind; and the controller produces one of a rebound condition signal and an uplift condition signal in dependence on the weight and the relative speed just before a rear end collision, and actuates the seat back recliner to rotate the seat back in the rearward direction in response to the rebound condition signal, and rotates the seat back in the forward direction in response to the uplift condition signal.

12. The vehicle as claimed in claim 1, wherein the vehicle further comprises a lateral acceleration sensor for sensing a vehicle lateral acceleration, and an occupant sensor for sensing a posture of a seat occupant; and the controller is configured to detect the possibility of sidewise deviation of the posture of the seat occupant, and to tighten the upper torso restraint when the possibility of sidewise deviation is detected.

13. The vehicle as claimed in claim 1, wherein the vehicle comprises a seat back recliner; the rear end collision sensor comprises a longitudinal acceleration sensor that senses a longitudinal acceleration of the vehicle; and the controller detects the occurrence of a rear end collision by comparing the longitudinal acceleration with a reference acceleration value, and further detects the occurrence of a front end collision by comparing a longitudinal deceleration of the vehicle sensed by the longitudinal acceleration sensor with a reference deceleration value, and rotates the seat back rearwardly with the seat back recliner when the occurrence of the front end collision is detected.

14. The vehicle as claimed in claim 1, wherein the controller comprises a section that calculates the relative speed of the following vehicle relative to the host vehicle, from the relative distance.

15. A vehicle comprising:
a seat comprising a seat cushion and a seat back;
a headrest mounted on an upper portion of the seat back;
a restraint system that secures a seat occupant on the seat and restrains the head of the seat occupant toward the headrest and straightens the spine of the seat occupant;
a rear end collision sensor that detects a possibility of a rear end collision of the vehicle in advance; and
a controller that drives the restraint system in response to detection of the possibility of a rear end collision,
wherein the restraint system comprises an upper torso restraint that restrains movement of the chest and a shoulder of a seat occupant, and a first actuator, connected with the upper torso restraint, that produces a restraint force with the upper torso restraint in response to a first trigger signal produced by the controller to drive the restraint system;
wherein the restraint system further comprises a pelvic restraint that restrains movement of the pelvis of a seat occupant, and a second actuator, connected with the pelvic restraint, that produces a restraint force with the pelvic restraint in response to a second trigger signal produced by the controller;
wherein the rear end collision sensor comprises a first section that senses a first condition that detects the possibility of a rear end collision of the vehicle and a second section that senses a second condition that detects the occurrence of a rear end collision of the vehicle; and the controller produces a prediction signal when the possibility of a rear end collision is detected, and a collision signal when the occurrence of a rear end collision is detected, and further produces the first trigger signal in response to the prediction signal to tighten the upper torso restraint before the occurrence of a rear end collision, and the second trigger signal in response to the collision signal to tighten the pelvic restraint upon the occurrence of a rear end collision,
wherein the first section of the rear end collision sensor comprises:
a distance sensor that senses a distance from the vehicle to a following vehicle behind; and
the controller calculates a first parameter representative of the possibility of a rear end collision in accordance with the distance, and produces the prediction signal when the first parameter is equal to or greater than a threshold, and
wherein the first parameter representative of the possibility of a rear end collision is a quotient resulting from division by a divisor which increases linearly with increase in the distance, of a dividend proportional to the square of a relative speed of the following vehicle relative to the vehicle equipped with the rear end collision sensor, the relative speed being calculated from the distance.

16. A vehicle comprising:
a seat comprising a seat cushion and a seat back;
a headrest mounted on an upper portion of the seat back;
a restraint system that secures a seat occupant on the seat and restrains the head of the seat occupant toward the headrest and straightens the spine of the seat occupant;
a rear end collision sensor that detects a possibility of a rear end collision of the vehicle in advance; and
a controller that drives the restraint system in response to detection of the possibility of a rear end collision,
wherein the restraint system comprises an upper torso restraint that restrains movement of the chest and a shoulder of a seat occupant, and a first actuator, connected with the upper torso restraint, that produces a restraint force with the upper torso restraint in response to a first trigger signal produced by the controller to drive the restraint system;

wherein the restraint system further comprises a pelvic restraint that restrains movement of the pelvis of a seat occupant, and a second actuator, adapted to be connected with the pelvic restraint, that produces a restraint force with the pelvic restraint in response to a second trigger signal produced by the controller;

wherein the rear end collision sensor comprises a first section that senses a first condition to detect the possibility of a rear end collision of the vehicle and a second section that senses a second condition and detects the occurrence of a rear end collision of the vehicle; and the controller produces a prediction signal when the possibility of a rear end collision is detected, and a collision signal when the occurrence of a rear end collision is detected, and further produces the first trigger signal in response to the prediction signal to tighten the upper torso restraint before the occurrence of a rear end collision, and the second trigger signal in response to the collision signal to tighten the pelvic restraint upon the occurrence of a rear end collision;

wherein the vehicle further comprises an occupant sensor that senses a seat condition to detect a nonstandard posture of a seat occupant; and the controller responds to the prediction signal by controlling the first actuator and the second actuator in a first mode when the nonstandard posture is not detected, and in a second mode different from the first mode when the nonstandard posture is detected; and wherein the controller reduces only the first trigger signal in the first mode to increase the restraint force with only the first actuator before the occurrence of a rear end collision, and produces both of the first trigger signal and the second trigger signal in the second mode and thereby increases the restraint force with both the first actuator and the second actuator and corrects the posture of a seat occupant before the occurrence of a rear end collision.

17. The vehicle as claimed in claim 16, wherein the occupant sensor comprises front and rear seat cushion load sensors and upper and lower seat back load sensors; and the controller compares a cushion front load sensed by the front seat cushion load sensor and a cushion rear load sensed by the rear seat cushion load sensor with each other, further compares a seat back upper load sensed by the upper seat back load sensor and a seat back lower load sensed by the lower seat back load sensor with each other, produces a condition signal indicative of detection of a nonstandard posture when the cushion rear load is equal to or smaller than the cushion front load, and the seat back upper load is equal to or smaller than the seat back lower load, and selects the second mode when the condition signal indicative of detection of a nonstandard posture is present.

18. The vehicle as claimed in claim 17, wherein the controller produces a first restore signal and a second restore signal when the possibility of a rear end collision diminishes; the first actuator slackens the upper torso restraint to a limited extent in response to the first restore signal; and the second actuator slackens the pelvic restraint to a limited extent in response to the second restore signal.

19. The vehicle as claimed in claim 16, wherein the vehicle further comprises a seat cushion lifter, and the controller is configured to actuate the seat cushion lifter in the second mode so as to raise a front portion of the seat cushion and to lower a rear portion of the seat cushion.

20. A vehicle comprising:
a seat comprising a seat cushion and a seat back;
a headrest mounted on an upper portion of the seat back;
a restraint system that secures a seat occupant on the seat and restrains the head of the seat occupant toward the headrest and straightens the spine of the seat occupant;
a sensor that senses a first condition and determines a relative distance from the vehicle which is hereinafter referred to as a host vehicle, to a following vehicle following the host vehicle, and a relative speed of the following vehicle relative to the host vehicle;
a controller configured to:
  calculate a parameter indicative of a deceleration of the following vehicle from the relative distance to the following vehicle and the relative speed of the following vehicle relative to the host vehicle,
  produce a prediction signal indicating the possibility of a rear end collision when the parameter is equal to or greater than a threshold, and
  drive the restraint system in response to the prediction signal, and
further comprising an occupant sensor which comprises front and rear seat cushion load sensors and upper and lower seat back load sensors; and wherein the controller determines a posture of a seat occupant in accordance with signals of the front and rear seat cushion load sensors and the upper and lower seat back load sensors when the possibility of a rear end collision is detected, and drives the restraint system in accordance with the posture of the seat occupant in response to detection of the possibility of the rear end collision.

21. A vehicle comprising:
a seat comprising a seat cushion and a seat back;
a headrest mounted on an upper portion of the seat back;
a shoulder belt that restrains the shoulder and chest of a seat occupant on the seat;
a first actuator that pulls the shoulder rearwardly toward a rear of the vehicle and pushes the upper torso of the seat occupant to the seat back;
a lap belt that restrains the pelvis of the seat occupant;
a second actuator that pulls the lap belt rearwardly toward the rear of the vehicle and pushes the pelvis of the seat occupant to the seat back;
a sensor that detects a possibility of impact on the seat occupant due to a rear end collision of the vehicle; and
a controller that drives first and second actuators, in response to detection of the possibility of impact on the seat occupant, and pulls the seat occupant rearwardly to the seat back with the shoulder belt and the lap belt;
wherein the first actuator includes a reversible belt retractor that tightens the shoulder belt by winding the shoulder belt, and slackens the shoulder belt by letting off the shoulder belt under the control of the controller, and the second actuator includes a reversible inner buckle actuator that tightens and slackens the lap belt under the control of the controller.

22. The vehicle as claimed in claim 21, wherein the sensor senses a first condition that determines a relative speed of a following vehicle behind relative to the vehicle equipped with the sensor, and the controller calculates a parameter representative of a possibility of a rear end collision, from the relative speed, and actuates at least the first actuator to pull the seat occupant rearward when the parameter is equal to or greater than a threshold.

23. The vehicle as claimed in claim 21, wherein the sensor comprises a first section that senses a first condition and detects the possibility of a rear end collision of the vehicle and a second section that senses a second condition to detect the occurrence of a rear end collision of the vehicle; and the controller actuates the first actuator to pull the seat occupant rearward with the shoulder belt when the possibility of a rear end collision is detected, and actuates the second actuator to further pull the seat occupant rearward with the lap belt when the occurrence of a rear end collision is detected.

24. The vehicle as claimed in claim 23, wherein the vehicle further comprises an occupant sensor that senses a seat condition and detects a nonstandard posture of a seat occupant; and the controller actuates the first actuator and the second actuator and pulls the seat occupant rearward with the shoulder belt and lap belt when the nonstandard posture is detected.

25. The vehicle as claimed in claim 21, wherein the controller slackens the shoulder belt and the lap belt by controlling the reversible belt retractor and the reversible inner buckle actuator when the sensor determines that the possibility of impact on the seat occupant diminishes.

26. The vehicle as claimed in claim 21, further comprising a shoulder anchor member that causes the shoulder belt to force the shoulder of the seat occupant rearward when an upper section of the shoulder belt is pulled by the first actuator.

* * * * *